(12) United States Patent
Mohammad et al.

(10) Patent No.: US 12,549,038 B2
(45) Date of Patent: Feb. 10, 2026

(54) SHIELDING SYSTEM FOR WIRELESS POWER TRANSFER

(71) Applicant: UT-Battelle, LLC, Oak Ridge, TN (US)

(72) Inventors: Mostak Mohammad, Oak Ridge, TN (US); Jason L. Pries, Oak Ridge, TN (US); Omer C. Onar, Oak Ridge, TN (US); Veda Prakash Galigekere, Oak Ridge, TN (US); Gui-Jia Su, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 923 days.

(21) Appl. No.: 17/587,261

(22) Filed: Jan. 28, 2022

(65) Prior Publication Data

US 2022/0242258 A1 Aug. 4, 2022

Related U.S. Application Data

(60) Provisional application No. 63/145,000, filed on Feb. 3, 2021, provisional application No. 63/143,071, filed on Jan. 29, 2021.

(51) Int. Cl.
| | | |
|---|---|---|
| H02J 50/70 | (2016.01) | |
| B60L 53/126 | (2019.01) | |
| B60L 53/36 | (2019.01) | |
| H01F 27/36 | (2006.01) | |
| H01F 38/14 | (2006.01) | |
| H02J 50/00 | (2016.01) | |
| H02J 50/10 | (2016.01) | |
| H02J 50/12 | (2016.01) | |
| H02J 50/40 | (2016.01) | |
| H02J 50/90 | (2016.01) | |

(52) U.S. Cl.
CPC ............ *H02J 50/70* (2016.02); *B60L 53/126* (2019.02); *B60L 53/36* (2019.02); *H01F 27/36* (2013.01); *H01F 38/14* (2013.01); *H02J 50/005* (2020.01); *H02J 50/10* (2016.02); *H02J 50/12* (2016.02); *H02J 50/402* (2020.01); *H02J 50/90* (2016.02)

(58) Field of Classification Search
USPC ........................................................ 320/108
See application file for complete search history.

(56) References Cited

U.S. PATENT DOCUMENTS

2007/0064406 A1* 3/2007 Beart .................... H01F 27/363
361/816
2019/0337393 A1* 11/2019 Von Novak, III ...... B60L 53/38

FOREIGN PATENT DOCUMENTS

| WO | 03/096512 | 11/2003 |
| WO | 2020/142621 | 7/2020 |

* cited by examiner

*Primary Examiner* — Mohammed Alam
(74) *Attorney, Agent, or Firm* — Warner Norcross + Judd LLP

(57) ABSTRACT

A shield construction for transfer of wireless power is provided. The shield construction be a magnetic shield in the form of a border or frame with respect to aspects of a wireless transmitter or a wireless receiver. The wireless transmitter or the wireless receiver, or both, may be double-D coil based configurations.

14 Claims, 12 Drawing Sheets

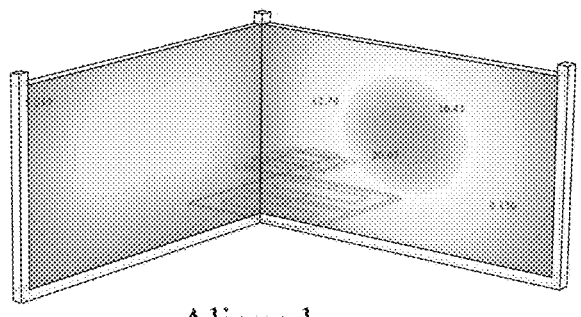
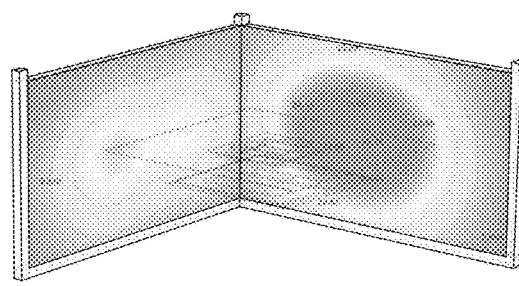
Aligned     Misaligned
Fig. 6A     Fig. 6B
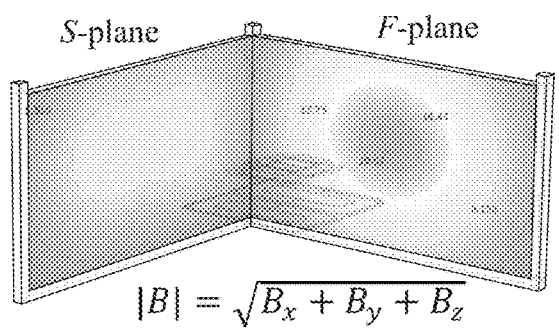
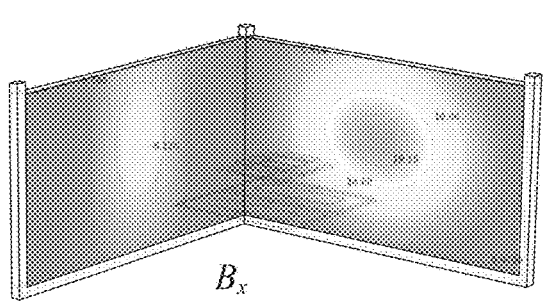
$|B| = \sqrt{B_x + B_y + B_z}$
Fig. 7A     Fig. 7B
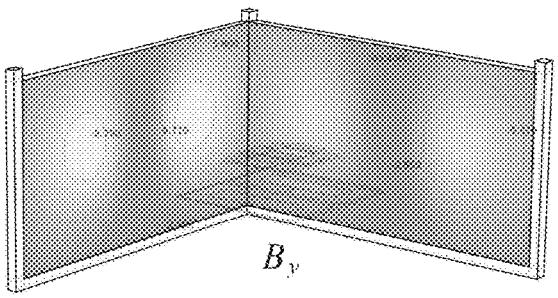
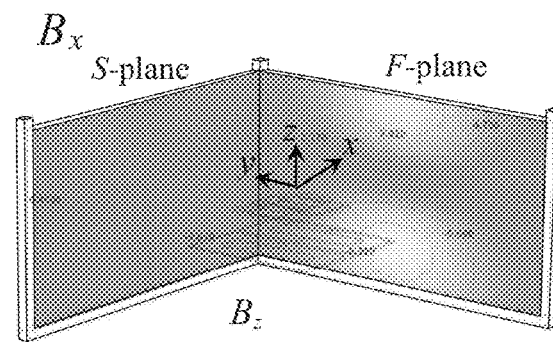
Fig. 7C     Fig. 7D

FLUX DENSITY UNDER MAX.
MISALIGNMENT

Tx-SHIELD CONSTRUCTION    Rx-SHIELD CONSTRUCTION

SIDE PLANE    FRONT PLANE

SHIELDING SYSTEM FOR WIRELESS POWER TRANSFER

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of transferring power wirelessly, and more particularly to a shielding system for a wireless power system.

BACKGROUND

Wireless charging systems (WCSs) are one of the most promising technologies being investigated to enhance the convenience of charging mobile objects, such as electric vehicles (EVs). Improvement in the efficiency and power density of WCSs along with the rapid growth of the EV market-which benefits from fast and convenient charging—have resulted in significant academic and industrial research attention on developing WCSs for high-power EV charging. However, for high-power applications, such as EV charging, the WCSs are highly prone to produce a significant level of electromagnetic field (EMF) emissions.

For instance, the power level of WCSs in EV applications ranges from a few hundred watts for small golf-carts, 3 to 20 kW for light-duty passenger vehicles, and greater than 50 kW for electric buses.

The WCSs in EV applications may produce high EMF emissions both inside and around the vehicle due at least in part to a significant amount of power that is transferred over a large airgap (e.g., an air gap that ranges between 10 and 30 cm). Field emissions have been governed by international guidelines to limit field emissions below levels considered safe to humans. For instance, there are several regulatory limits on low-frequency (<1 MHz) EMF emissions. For EMF emissions testing, the Society of Automotive Engineers (SAE) standard J2954 follows the guidelines of the International Commission of Non-Ionized Radiation Protection (ICNIRP). According to the ICNIRP 2010 guidelines, the magnetic field limit for the 3 kHz to 10 MHz frequency range is 27 µTrms for general-public exposure and 15 µTrms in areas where body-implanted pacemakers are a concern. Conventional efforts have been directed toward complying with these limits.

Efforts have also been directed toward limiting field emissions from interfering with vehicle-side electronic systems, such as keyless entry and remote start systems, tire pressure sensors, and vehicle infotainment systems. In the case of connected and automated vehicles, other controls, communications, and sensing systems may also be impacted by field emissions.

Conventional shield configurations have attempted to suppress the MFE of a WCS. For instance, to limit the magnetic field emissions (MFE) below the ICNIRP limits, SAE has recommended a large (800×800) mm aluminum shield above a receiver pad. The undercarriages of battery-powered EVs are flat, metallic, and ferrous (in some cases), which also act as a lossy conductive shield. Both the large aluminum shield and the EV undercarriage suppress at least a portion of the MFE for unipolar (e.g., circular, rectangular) charging pads. However, the conductive aluminum shield is not effective for DD charging pads. Therefore, with such a conventional large aluminum shield, the MFE from the DD charging pads exceeds the ICNIPR limit of 27 µT even at ~11 kW power levels, and particularly under misaligned conditions.

Alternative active and passive shielding constructions have been provided for WCSs in an attempt to reduce the MFE. These alternative active and passive shielding constructions have been provided for unipolar circular and rectangular pads.

Limited efforts have been directed to investigating a magnetic shield (MS) in conjunction with a WCS. For instance, a conventional MS has been tested for DD pads at a power of a few kW. However, for a high-power DD pad, the suppression effects of a conventional MS have not been studied in significant detail.

A conventional partial ferrite extension has been incorporated into a WCS to yield a 46% reduction in the MFE for DD pads. Conventional extension of the ferrite core may reduce the MFE of a DD coil-based WCS pad for a limited power application.

Although the conventional ferrite extension and the conventional MS have been investigated separately for WCS applications, these conventional efforts do not demonstrate a shield construction that can be generalized and applied for up to several hundred kilowatts of power.

Applications for WCSs span both single phase and multiple-phase constructions across a variety of power levels. High-power WCS for electric vehicles have been demonstrated for up to about 120 kW for the passenger vehicles, about 250 kW for electric bus, and about 1 MW for electric trains. Many of the high power industrial and laboratory WCSs utilize single-phase topology. However, in an effort to increase power density, 3-phase WCSs have been explored. A 3-phase WCS can provide a much higher power density than a single phase WCS; therefore, a conventional 3-phase WCS has been deployed for extremely high-power wireless charging applications.

Similar to a single-phase WCS, a high-power 3-phase WCS is prone to generate high MFE. Accordingly, conventional efforts have been made to limit field emissions inside and around the vehicle to be within limits recommended by regulatory authorities, such as ICNIRP and the SAE. The ICNIRP 2010 limit for 10 kHz to 100 kHz frequency is 27 LIT RMS or 38 LIT peak for magnetic fields and 83 V/m for electric fields.

A variety of 3-phase WCSs and associated coil geometries have been studied for electric vehicle charging applications. For instance, the conventional coil geometry of a 3-phase WCS for a track-type dynamic system is much different from the conventional coil geometry for a stationary 3-phase WCS.

The 3-phase WCS, in one conventional stationary arrangement, uses three unipolar coils placed side by side with or without any overlapping. This conventional stationary 3-phase WCS includes three unipolar-circular coils separated from each other by a few millimeters, with the coils disposed on the same or three separate cores. However, this conventional stationary 3-phase WCS includes a core, but does not include a MS to limit field emissions.

Conventional 3-phase WCSs suffer from the field emission issues similar to their single-phase counterparts. Although power density is greater for a 3-phase system relative to a single-phase system, the higher power can lead to a construction that exceeds field emission limits defined by a regulatory authority, such as the ICNIRP and the SAE. The conventional aluminum shield described in connection with a conventional single-phase coil arrangement is considered ineffective for poly-phase (e.g., multi-phase) systems.

SUMMARY

In general, one innovative aspect of the subject matter described herein can be embodied in a wireless power transfer (WPT) system for wirelessly providing high-frequency AC power to an electric vehicle or a plug-in electric vehicle. The system may include an off-board transmitter with a transmitter pad configured to wirelessly transmit the high-frequency AC power. The transmitter pad may include a double-D (DD) coil backed by a core. The system may include an on-board receiver that includes a receiver pad configured to receive the high-frequency AC power when the transmitter pad and the receiver pad are disposed adjacent to each other and spaced apart through a gap. The receiver pad may include a DD coil backed by a core. The on-board receiver may include a magnetic material-based shield that is disposed, on the core side of the receiver pad that opposes the gap, to form a border around the receiver pad. The magnetic material-based shield may include a high-permeability magnetic material.

The foregoing and other embodiments can each optionally include one or more of the following features, alone or in combination. In particular, one embodiment includes all the following features in combination.

In some embodiments, the off-board transmitter may include another magnetic material-based shield that is disposed, on the core side of the transmitter pad that opposes the gap, to form a border around the transmitter pad. The other magnetic material-based shield may include a high-permeability magnetic material.

In general, one innovative aspect of the subject matter described herein can be embodied in a wireless power transfer (WPT) system for wirelessly providing high-frequency AC power to an electric vehicle or a plug-in electric vehicle. The system may include an off-board transmitter with a transmitter pad configured to wirelessly transmit the high-frequency AC power, where the transmitter pad may include a double-D (DD) coil backed by a core. The transmitter pad may include a magnetic material-based shield that is disposed, on the core side of the transmitter pad that opposes the gap, to form a border around the transmitter pad. The magnetic material-based shield may include a high-permeability magnetic material.

The system may include an on-board receiver with a receiver pad configured to receive the high-frequency AC power when the transmitter pad and the receiver pad are disposed adjacent to each other and spaced apart through a gap. The receiver pad may include a DD coil backed by a core.

The foregoing and other embodiments can each optionally include one or more of the following features, alone or in combination. In particular, one embodiment includes all the following features in combination.

In some embodiments, each of the transmitter pad and the receiver pad may include a respective Al backplate disposed such that the pad's core is sandwiched between the pad's DD coil and the pad's Al backplate.

In some embodiments, for each of the transmitter pad and the receiver pad, a separation between the border and the pad's core may have predetermined sizes for corresponding pad's sides.

In some embodiments, for each of the transmitter pad and the receiver pad, a width of the border may have predetermined values for corresponding pad's sides.

In some embodiments, for each of the transmitter pad and the receiver pad, a thickness of the border may have predetermined values for corresponding pad's sides.

In some embodiments, the high-permeability magnetic material may include either a continuous layer or multiple bars.

In some embodiments, the high-permeability magnetic material may include one of ferrite, magment, or nanocrystalline material.

In some embodiments, the high-permeability magnetic material may include material like the core's material.

In some embodiments, the high-frequency AC power may be in a range of 5-50 kW.

In some embodiments, the high-frequency AC power may be about 11 kW.

In some embodiments, a fundamental frequency of the high-frequency AC power may be in a range of 3 kHz-10 MHz.

In some embodiments, the fundamental frequency may be about 85 kHz.

In general, one innovative aspect of the subject matter described herein can be embodied in a wireless power transmitter comprising a transmitter configured to wirelessly transmit power, and a core disposed proximal to the transmitter. The core may include a transmitter-side that faces the transmitter and a rear-side opposite the transmitter-side. The wireless power transmitter may include a magnetic material-based shield that includes a first layer, where the first layer includes a first layer outer perimeter and a first layer inner perimeter defined by a first aperture provided in the first layer. The magnetic material-based shield may be disposed to face the rear-side of the core.

The foregoing and other embodiments can each optionally include one or more of the following features, alone or in combination. In particular, one embodiment includes all the following features in combination.

In some embodiments, the first layer may form a border around the transmitter and the core.

In some embodiments, the first layer may include high-permeability magnetic material.

In some embodiments, the transmitter may include a double-D (DD) coil operable couple inductively with a receiver for wireless power transfer to the receiver.

In some embodiments, the wireless power transmitter may include a backplate arranged to sandwich the core between the transmitter and the backplate.

In some embodiments, a width of the first layer may be defined by a distance between the first layer outer perimeter and the first layer inner perimeter. The width may be determined based on a size of at least one of the transmitter and the core.

In some embodiments, a thickness of the first layer may be based on a size of at least one of the transmitter and the core.

In some embodiments, gap may be provided between an outer core perimeter of the core and the first layer inner perimeter of the first layer, and where the gap may be based on a size of at least one of the transmitter and the core.

In general, one innovative aspect of the subject matter described herein can be embodied in a wireless power receiver that includes a receiver operable to receive wireless power from a wireless power transmitter. The wireless power receiver may include a core disposed proximal to the receiver, where the core includes a receiver-side that faces the receiver and a rear-side opposite the receiver-side. The wireless power receiver may include a magnetic material-based shield including a first layer, where the first layer may include a first layer outer perimeter and a first layer inner perimeter defined by a first aperture provided in the first layer. The magnetic material-based shield may be disposed to face the rear-side of the core.

The foregoing and other embodiments can each optionally include one or more of the following features, alone or in combination. In particular, one embodiment includes all the following features in combination.

In some embodiments, the first layer may form a border around the receiver and the core.

In some embodiments, the first layer may include high-permeability magnetic material.

In some embodiments, the receiver may include a double-D (DD) coil operable couple inductively with a transmitter for wireless power transfer to the receiver.

In some embodiments, the wireless power receiver may include a backplate arranged to sandwich the core between the receiver and the backplate.

In some embodiments, a width of the first layer may be defined by a distance between the first layer outer perimeter and the first layer inner perimeter. The width may be determined based on a size of at least one of the receiver and the core.

In some embodiments, a thickness of the first layer may be based on a size of at least one of the receiver and the core.

In some embodiments, a gap may be provided between an outer core perimeter of the core and the first layer inner perimeter of the first layer. The gap may be based on a size of at least one of the receiver and the core.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 6A shows MFE for an aligned arrangement of a wireless power coupler in one embodiment.
FIG. 6B shows MFE for a misaligned arrangement of the wireless power coupler in one embodiment.
FIG. 7A shows MFE magnitude for a wireless power coupler in one embodiment.
FIG. 7B shows a vector component of MFE depicted in FIG. 7A.
FIG. 7C shows a vector component of MFE depicted in FIG. 7A.
FIG. 7D shows a vector component of MFE depicted in FIG. 7A.

DESCRIPTION

The present disclosure is directed to a shield construction for transfer of wireless power. The shield construction may be a magnetic shield in the form of a border or frame with respect to aspects of a wireless transmitter or a wireless receiver. The wireless transmitter or the wireless receiver, or both, may be double-D coil based configurations.

The present disclosure is also directed to a shield construction for transfer of wireless power. The shield construction may be a magnetic shield having a plurality of layers and provided for a wireless transmitter or a wireless receiver, or both. The magnetic shield may include a first layer and a second layer, where the first layer may be nearer to a core than the second layer, and where the second layer may include a second layer area that is larger than a first layer area of the first layer. The wireless transmitter and the wireless receiver may be configured to multi-phase wireless power transfer.

I. Overview

Figure 1:
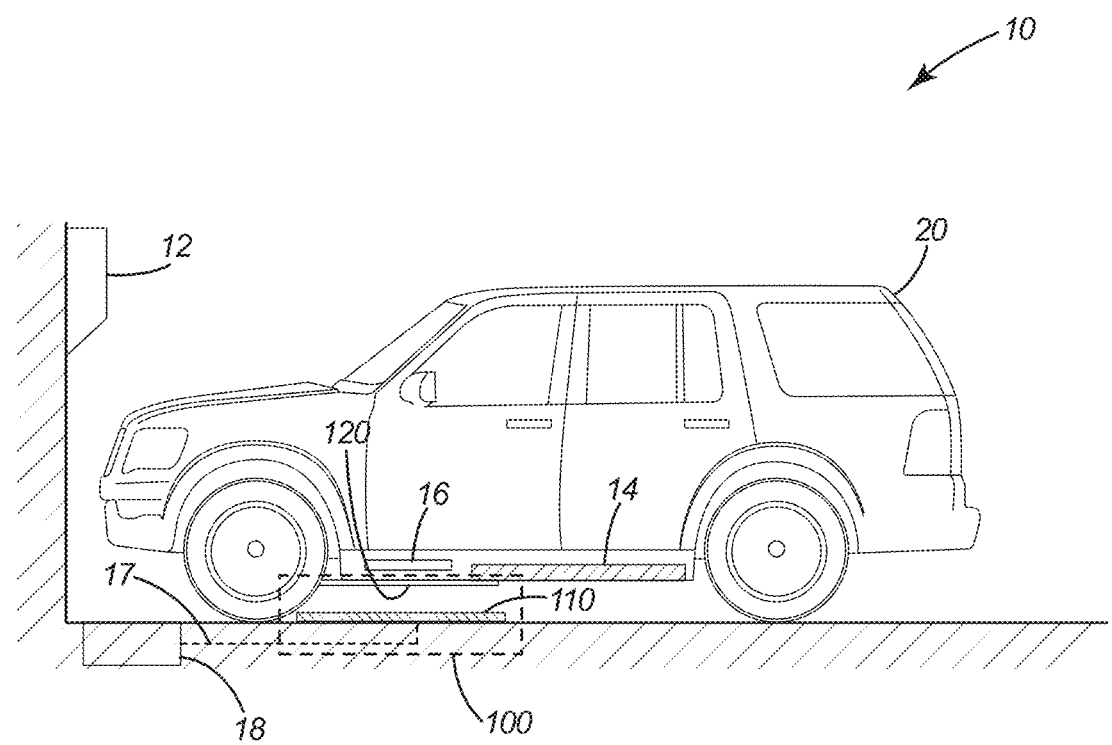
FIG. 1 shows a wireless power system in accordance with one embodiment.

A wireless power system (WPS) 10 (e.g., a wireless charging system) in accordance with one embodiment is depicted in FIG. 1. The WPS 10 may include a wireless power transmitter 110, which may be incorporated into a surface over which a mobile object, such as a vehicle 20, that includes a wireless power receiver 120. For instance, in the illustrated embodiments, the vehicle 20 may be driven into position over the wireless power transmitter 110 to receive power wirelessly via the wireless power receiver 120. Although the mobile object of the WPS 10 is described herein as a vehicle 20, it should be understood that the present disclosure is not so limited and that the mobile object may be any type of device or object that incorporates a wireless power receiver 120.

The WPS 10 in the illustrated embodiment includes a power interface 12 operable to receive power from a power source, such as utility power. The power interface 12 may be coupled to switching circuitry 18 operable to supply power to the wireless power transmitter 110 in order to transfer power wirelessly to the wireless power receiver 120. The switching circuitry 18 may be coupled to the wireless power transmitter 110 via a high-frequency conductive link 17.

The wireless power receiver 120, as described herein, may receive power wirelessly from the wireless power transmitter 110. The wireless power receiver 120 may be coupled electrically to a vehicle controller 16, which may be operable to direct power received from the wireless power receiver 120 toward a battery 14. As described herein, the wireless power system 10 is not limited to a particular type of mobile object for instance, a battery 14 may be absent from the mobile object in one embodiment.

As discussed herein, the WPS 10 may be configured differently than the configuration depicted in the illustrated embodiment. For instance, the WPS 10 in the illustrated embodiment incorporates a DD coil configuration in both the wireless power receiver 120 and the wireless power transmitter 110; however, the WPS 10 may be configured differently. It is further noted that a variety of shielding configurations are described herein with respect to single phase or multiphase configurations. It is noted that any aspect of embodiments described in conjunction with a single-phase configuration may be incorporated into a multiphase configuration, and likewise any aspect of embodiments described in conjunction with multiphase configurations may be incorporated into a single-phase configuration.

The input voltage of the WPS 10 may be provided via the power interface 12 in the form of AC power (e.g., grid power that is single phase or multi-phase), which may be supplied to switching circuitry 18. The switching circuitry 18, in one embodiment, may convert the power received from the power interface 12 into DC power, which can be inverted in accordance with a switching frequency to yield a high-frequency signal. This high-frequency signal may be supplied to the wireless power transmitter 110 in order to transfer wireless power to the wireless power receiver 120.

The switching circuitry 18 may include rectification circuitry (passive or active), and may be configured in one embodiment to vary power, or a characteristic thereof, that is supplied to the wireless power transmitter 110 (also described herein as an inverter).

The WPS 10 in the illustrated embodiment of FIG. 1 includes a mobile object in the form of a vehicle 20. However, the mobile object may be any type of apparatus or device, including, for instance, a mobile phone, a drone, a robotic-device, or table top appliance. Additional examples of applications include a vehicle provided as an electric vehicle, a plug-in hybrid electric vehicle, or an electric/plug-in hybrid combat vehicle. Further example applications can relate to energy storage provided in a variety of forms, including a stationary or mobile energy storage system, a low/high voltage battery charger being a cell phone, a laptop, a tablet, a power tool, a gardening tool, a handheld vacuum cleaner, a kitchen gadget, any type of battery charger or adapter, chargers for portable electronics (including cameras, laptops, and cell phones), house-hold appliances with grid isolation requirements, air mobility vehicles (such as electric/hybrid propulsion aircraft, drones, UAVs, and satellites), laser applications, LEDs, single-phase or three-phase grid systems with medium or low grid voltage networks, fuel cell, solar, or wind turbine renewable energy conversion systems, microturbines (e.g., in grid connected applications), and High Voltage (HV) systems.

The vehicle 20 in the illustrated embodiment includes a wireless power receiver 120 (e.g., a receiver) separable from and capable of coupling with a wireless power transmitter 110. Together, the wireless power receiver 120 and the wireless power transmitter 110 may form a wireless power coupler 100.

In the illustrated embodiment, the wireless power transmitter 110 may be considered an off-board module, and one or more aspects of the vehicle 20, as described herein, may be considered an on-board module. For instance, the vehicle controller 16 may include rectification circuitry that forms at least part of an on-board module of a vehicle. The on-board module may form part of an energy storage charging system of the vehicle 20, where a load is a battery 14 of the vehicle 20.

The switching circuitry 18 in the illustrated embodiment may include an H-bridge (not shown) inverter configuration (e.g., a full bridge) with first, second, third, and fourth switches S1, S2, S3, S4 capable of operating in conjunction with each other to provide input power to the wireless power transmitter 110. The switches S1, S2, S3, S4 may be MOSFETs or any other type of switch capable of selectively supplying power to the wireless power transmitter 110. The switches S1, S2, S3, S4 may be operably coupled respectively to diodes D1, D2, D3, D4, which may be integral body diodes of the switches S1, S2, S3, S4.

The switching circuitry 18 may include a controller operatively coupled to one or more components of the WPS 10 to direct operation of the H-bridge to generate the high frequency signal supplied to the wireless power transmitter 110.

The switching circuitry 18 may include any and all electrical circuitry and components to carry out the functions and algorithms described herein. Generally speaking, the switching circuitry 18 may include one or more microcontrollers, microprocessors, and/or other programmable electronics that are programmed to carry out the functions described herein. The switching circuitry 18 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the WPS 10, or they may reside in a common location within the WPS 10. When physically distributed, the components may communicate using any suitable serial or parallel communication protocol, such as, but not limited to, CAN, LIN, FireWire, I2C, RS-232, RS-485, and Universal Serial Bus (USB).

Figure 2:
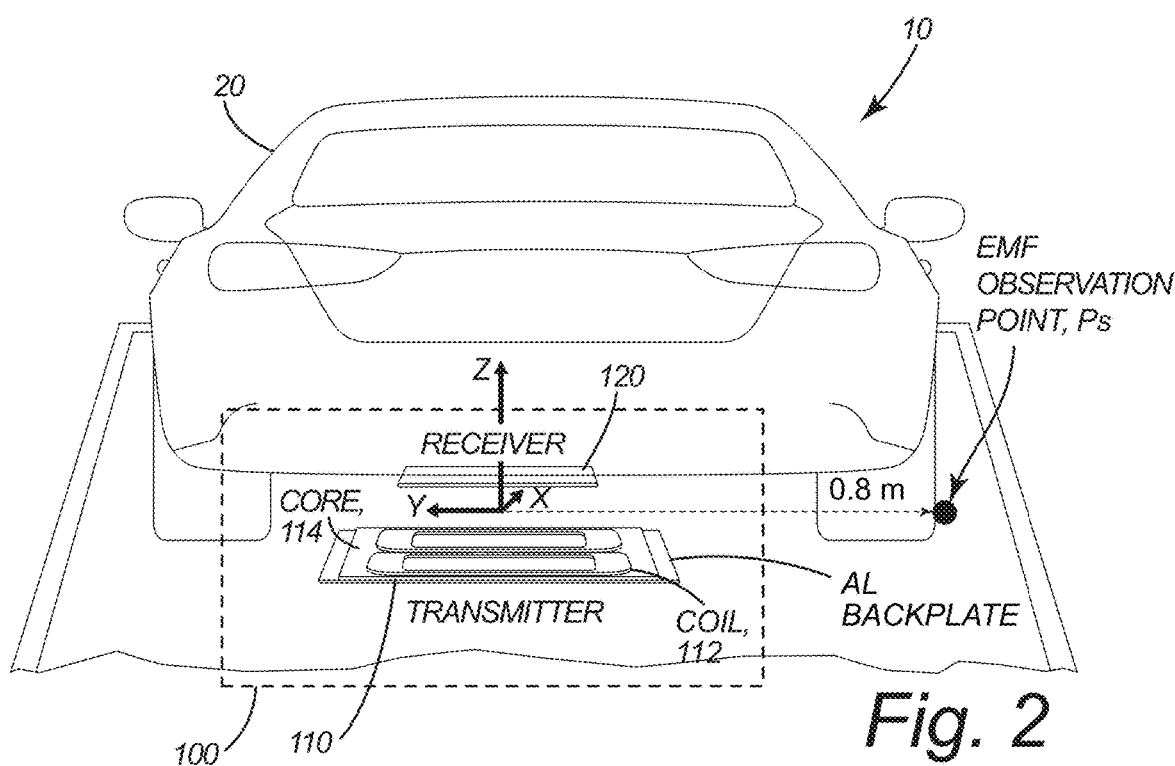
FIG. 2 shows a wireless power system in accordance with one embodiment.

A partial view of the WPS 10 in accordance with one embodiment is depicted in FIG. 2 with the wireless power coupler 100 including the wireless power transmitter 110 and the wireless power receiver 120 spaced apart from each other and separated by an airgap. The wireless power transmitter 110 and illustrated embodiment includes a coil, a core, and a backplate (e.g., an aluminum backplate). As described herein, the coil may be a DD coil configuration, and the core may be ferrite core. For purposes of discussion and efficiency analysis, and observation point Ps is defined at a distance from the wireless power coupler 100, such as a distance of 0.8 m. This observation point Ps may be utilized for analysis of field emissions from the wireless power coupler 100, such as electric field emissions and magnetic field emissions.

Figure 4:
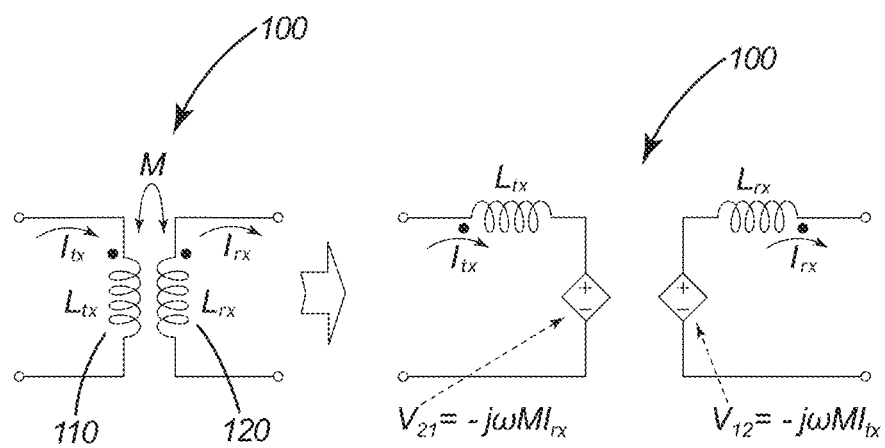
FIG. 4 shows an equivalent circuit of a wireless power coupler in accordance with one embodiment.

An equivalent circuit of the wireless power coupler 100 in accordance with one embodiment is depicted in FIG. 4, with the wireless power transmitter 110 including a transmitter $L_{tx}$, also described as a transmitter coil, and the wireless power $L_{rx}$, also described as a receiver coil.

The currents through the transmitter and receiver coils are considered to be the primary source of MFE. The total ampere-turns in the transmitter and receiver coils are determined by the operating frequency, coupling factor, and the required output power.

Power flow from the primary coil to the secondary coil can be given as:

$$P = \omega M I_{tx} I_{rx}^* = 2\pi f k \sqrt{L_{tx} L_{rx}} I_{tx} I_{rx}^* \quad (1)$$

where $I_{tx}$ and $I_{rx}$ are the transmitter and receiver coil currents, f is the operating frequency, $L_{tx}$ and $L_{rx}$ are the self-inductances, and k is the coupling coefficient. The inductance of the coils can be expressed in terms of the number of turns and average inductance per turn as $$L_{tx} = N_{tx}^2 \hat{L}_{tx},$$

$$L_{rx} = N_{rx}^2 \hat{L}_{rx} \quad (2)$$

where $\hat{L}_{tx}$ and $\hat{L}_{rx}$ are the average inductance-per-turn of the transmitter and receiver coils. Using the expressions of Eq. 2, Eq. 1 can be further expanded to:

$$P = 2\pi f k (N_{tx} I_{tx})(N_{rx} I_{rx}^*) \sqrt{\hat{L}_{tx} \hat{L}_{rx}} \quad (3)$$

The equations show that the number of ampere-turns in the transmitter and receiver at a certain power is determined by the coupling coefficient, frequency, and size of the coils, which determine the $\hat{L}_{tx}$ and $\hat{L}_{rx}$. The geometric parameters k, $\hat{L}_{tx}$, and $\hat{L}_{rx}$ depend on the size, shape, and topology of the transmitter or receiver and can be assumed to be independent of the number of turns. Eq. 2 shows that for a given power level, the ampere-turns of the coils (a factor that affects MFE) may be determined by the size of the coils and the operating frequency.

For a fixed airgap, size, and alignment of the charging pads, k, $\hat{L}_{tx}$, and $\hat{L}_{rx}$ are constant and do not depend on the number of turns. As a result, according to Eq. 3, $N_{tx} I_{tx} N_{rx} I_{rx}$ is also constant for a certain fixed coil size, alignment, airgap, and output power. The ratio between the primary and secondary ampere-turns can be given as $$r_{NI} = \frac{N_{tx} I_{tx}}{N_{rx} I_{rx}}.$$

A WPS 10 in accordance with one embodiment may be designed and operated with different $r_{NI}$ for a certain power, equivalently, with different VA loading in the primary and secondary coils. These variations of $r_{NI}$ may impact the MFE of the WPS 10. Therefore, the ratio $r_{NI}$ may be enhanced or optimized during the design stage, and, during operation under different misalignment conditions.

In one embodiment, with a geometrically matched system with identically sized wireless power transmitter 110 and wireless power receiver 120, the MFE per unit ampere-turns from the transmitter and receiver may be the same. As a result, the minimum MFE may be achieved when $r_{NI} \approx 1$.

In an alternative embodiment, the WPS 10 may be mismatched such that the wireless power transmitter 110 may be considerably larger than the wireless power receiver 120. The MFE per unit ampere-turns in this embodiment, from the transmitter may be much higher than the receiver. As a result, the WPS 10 may be constructed to enhance or optimize the $r_{NI}$ to reduce or minimize unshielded MFE. Analysis may be conducted to identify the relative MFE from each coil, and shield constructed may be adapted accordingly. Enhancement or optimization of $r_{NI}$ may further depend on the input-output voltages and degree-of-freedom in the selected compensation topologies.

The flux density at any point is the vector sum of the flux densities due to the transmitter and receiver ampere-turns, which can be expressed according to Eq. 4.

$$\vec{B} = \vec{B}_{tx} + \vec{B}_{rx} \quad (4)$$

where $\vec{B}_{tx}$ is the flux density generated by the transmitter current $I_{tx}$, and $\vec{B}_{rx}$ is the flux density generated by the receiver current $I_{rx}$. Moreover, the MFE is the vector sum of the MFE generated by the transmitter and receiver coils. The MFE contribution from each coil depends on their ampere-turns, their sizes, and positions relative to the observation point Ps. It is noted that rather than analytically expressing the relation between the coil-size and MFE for a coil with ferrite and aluminum backplate, an FEA tool may be used to evaluate these flux-density distributions around the 2D or 3D models of the coils, where the ampere-turns are provided as the coil-excitation. The flux density is proportional to the ampere-turns of the coils, which can be expressed as:

$$B_{tx} \propto N_{tx} I_{tx},$$

$$B_{rx} \propto N_{rx} I_{rx} \quad (5)$$

Therefore, once the MFE is simulated through FEA for per unit ampere-turns for the transmitter and receiver coils, the final MFE can be calculated using Eq. 4. This approach may be utilized in investigating the MFE of the WPS 10. It is noted that this approach may be limited to a specific size, geometry, and coil position. Therefore, this approach may not provide a comprehensive understanding of the individual contribution of MFE, $B_{tx}$ and $B_{rx}$, during a geometric design and optimization process, or during testing of the WPS 10.

An alternative approach in accordance with one embodiment is to segregate MFE based on the current phase angle, which may only be applicable when the $I_{tx}$ and $I_{rx}$ are highly sinusoidal and orthogonal in phase. In such cases, the MFE of the transmitter coil and receiver coil are also orthogonal in phase. This property can be utilized to identify the relative contribution to MFE from individual coils, and to evaluate performance of a shield construction in accordance with one embodiment.

The transmitter and receiver coil currents, in one embodiment, are highly sinusoidal in an inductive WPS 10 due to the low-pass filter characteristics of the resonant tuning or compensation networks. As a result, the first harmonic approximation can be adopted for the analytical model. And, for several compensation topologies, such as series and LCC compensations, the coil currents are approximately 900 phase apart at the resonant point, which can be expressed in complex form as $$I_{tx} = \hat{I}_{tx} + 0*j,$$

$$I_{rx} = +j\hat{I}_{rx} \quad (6)$$

where $\hat{I}_{tx}$ and $\hat{I}_{rx}$ are the peak value of $I_{tx}$ and $I_{rx}$. Eqs. 5 and 6 indicate that the real and imaginary parts of the flux density are generated by the transmitter and receiver currents, respectively, which can be expressed as:

$$B_{tx} = \text{real}(B),$$

$$B_{rx} = \text{img}(B) \quad (7)$$

The vector components of the time-varying leakage flux at the observation point can also be represented by its vector components as $$B = \hat{x}B_x + \hat{y}B_y + \hat{z}B_z \quad (8)$$

where, $B_x$, $B_y$, and $B_z$ are the x-, y-, and z-axis directional components of the flux density, and $\hat{x}$, $\hat{y}$, and $\hat{z}$ are the unit vectors associated with the Cartesian coordinate system. Each vector component of the AC magnetic field can be expressed in complex form as:

$$B_x = B_{x\text{-real}} + jB_{x\text{-img}}$$

$$B_y = B_{y\text{-real}} + jB_{y\text{-img}}$$

$$B_z = B_{z\text{-real}} + jB_{z\text{-img}} \quad (9)$$

where the subscript "real" indicates the real and "img" indicates the imaginary components of the complex representation of the time-varying sinusoidal waveform.

From Eqs. 7 and 9, the vector component of the MFE generated by the transmitter and receiver coil can be separated as:

$$\vec{B}_{tx} = \text{real}(B) = \hat{x}B_{x\text{-real}} + \hat{y}B_{y\text{-real}} + \hat{z}B_{z\text{-real}}$$

$$\vec{B}_{rx} = \text{img}(B) = \hat{x}B_{x\text{-img}} + \hat{y}B_{y\text{-img}} + \hat{z}B_{z\text{-img}} \quad (10)$$

As the MFE from the transmitter and receiver pads is separated by Eq. 10, the shielding targets for the transmitter and the receiver coils can become more specific and can be more clearly defined.

In a WPS 10 configured for single-phase with a wireless power transmitter 110 including one transmitter coil 112 and a wireless power receiver 120 including one receiver coil 122, the coil currents at resonance frequency are approximately 90-degree phase apart. A WPS 10 operable for polyphase or multiphase, on the other hand, may have two or more phases on each of the wireless power transmitter and the wireless power receiver, and one or more coil-windings for each phase. A wireless power coupler 200 operable for use with such a polyphase-configured WPS 10 is depicted in illustrated embodiment of FIGS. 12 and 13, and includes a wireless power transmitter 210 and the wireless power receiver 220. The wireless power transmitter 210 includes a plurality of transmitter coils 212 and a transmitter core 214, and the wireless power receiver 220 includes a plurality of receiver coils 222 and a receiver core 236.

Due at least in part to the polyphase operation of a WPS 10, the magnetic flux of such a WPS 10 may depend on the spatial orientation of phase-coils and the relative electrical phase angle of the currents through the coils. The MFE around the vehicle 20 due to an operating polyphase WPS 10 may depend on a variety of factors, including one or more of the transferred power, input-output voltage levels, operating frequency, geometry and size of couplers, airgap, shielding method and vehicle size. The amp-turns through the transmitter coils and receiver coils are the principal source of the leakage field. The total MFE may be the vector sum of the MFEs due to the wireless power transmitter 110 in the wireless power receiver 120.

Phases of the wireless power transmitter 210 and the wireless power receiver 220 for a three-phase balanced system may be identified as $A_g$, $B_g$, and $C_g$ for the wireless power transmitter and $A_v$, $B_v$, and $C_v$ for the wireless power receiver. The currents through phases $A_g$, $B_g$, and $C_g$ are 120 (or nearly 120) degrees phase shifted from each other. The phase difference between currents of the wireless power transmitter 210 in the wireless power receiver 220, $A_g$ to $A_v$, $B_g$ to $B_v$, and $C_g$ to $C_v$, are approximately 90 degrees apart at the resonance frequency operation.

The three-phase currents may generate a rotating magnetic field in the core and in the air. At any time, the flux density pattern of a 3-phase WPS 10 may be similar to the peak flux density pattern of a single-phase WPS 10, because each phase may be generated by a bipolar coil. The direction of the peak flux density in the 3-phase WPS 10, however, may rotate a full cycle around the wireless power transmitter 110 in a time-period. Therefore, the peak flux emission of a circular and hexagonal three-phase WPS 10 is approximately the same all around the wireless power transmitter 110.

Excitation and geometric parameters may be considered in analyzing a polyphaser-configured WPS 10. The excitation parameters may depend on the specifications of the supply power and output power source/storage units. For a certain power transfer, the MFE may depend on the number of turns and current of the coils provided in the wireless power transmitter 210 and the wireless power receiver 220, and overall size of these coils and their relative alignment.

$$MFE = f(N_v, N_g, I_v(M_{gv}, d), I_g(M_{gv}, d), r_v, r_g, \Delta) \quad (11)$$

Where $N_v$, $N_g$, $I_v$, and $I_g$ are the number of turns and currents through the vehicle-pad (wireless power receiver 220) and the ground-pad (wireless power transmitter 210), $M_{gv}$ is the mutual inductance between the transmitter and receiver coils, d is the airgap, $r_g$, $r\_v$ are the distance of the observation region from the transmitter and receiver coils and $\Delta$ is the misalignment.

With the geometry and the number of turns of the wireless power transmitter 210 and the wireless power receiver 220 being determined, the parameters for MFE analysis are the current through the coils 212, 222 for a target airgap and misalignment conditions. The relation of coil currents and the power for a 3-phase WCS can be expressed as:

$$P = j\omega I_v^H M_{gv} I_g = 9/2 \omega M_{gv} I_v I_g \quad (12)$$

where $I_g$ and $I_v$ are rms values of the ground-pad and vehicle-pads' coil-currents expressed as, $$I_g = [I_{ga} I_{gb} I_{gc}]^T$$

$$I_v = [I_{va} I_{vb} I_{vc}]^T \quad (13)$$

and the mutual inductance matrix $M_{gv}$ between the primary and secondary coils is expressed as, $$M_{gv} = \begin{bmatrix} M_{ga}^{va} & M_{gb}^{va} & M_{gc}^{va} \\ M_{ga}^{vb} & M_{gb}^{vb} & M_{gc}^{vb} \\ M_{ga}^{vc} & M_{gb}^{vc} & M_{gc}^{vc} \end{bmatrix}. \quad (14)$$

After getting the mutual inductance, different sets of currents $I_g$ and $I_v$ can be calculated from Eq. 11 for a target power transfer level. These currents $I_g$ and $I_v$ are likely to be in the similar range for a matched WPS 10 with the same AWG wire. These currents can be realized through the selection of input and output dc voltages, inverter control, and compensation networks. For purposes of disclosure, a set of $I_g$ and $I_v$ are determined and described herein in conjunction with a matched 50 kW 3-phase WPS 10 configured as follows:

TABLE I

NOMINAL SYSTEM PARAMETERS

| Parameter | Value |
| --- | --- |
| Nominal power | 50 kW |
| Transmitter currents (RMS) | 75.2 A, 75.2 A, 75.2 A |
| Receiver current | 70 A, 70 A, 70 A |
| Transmitter turns | 5, 5, 5 |
| Receiver turns | 5, 5, 5 |
| Resonance frequency | 85 kHz |
| Air gap | 150 mm |

II. Field Regions and Test Regions

Figure 3:
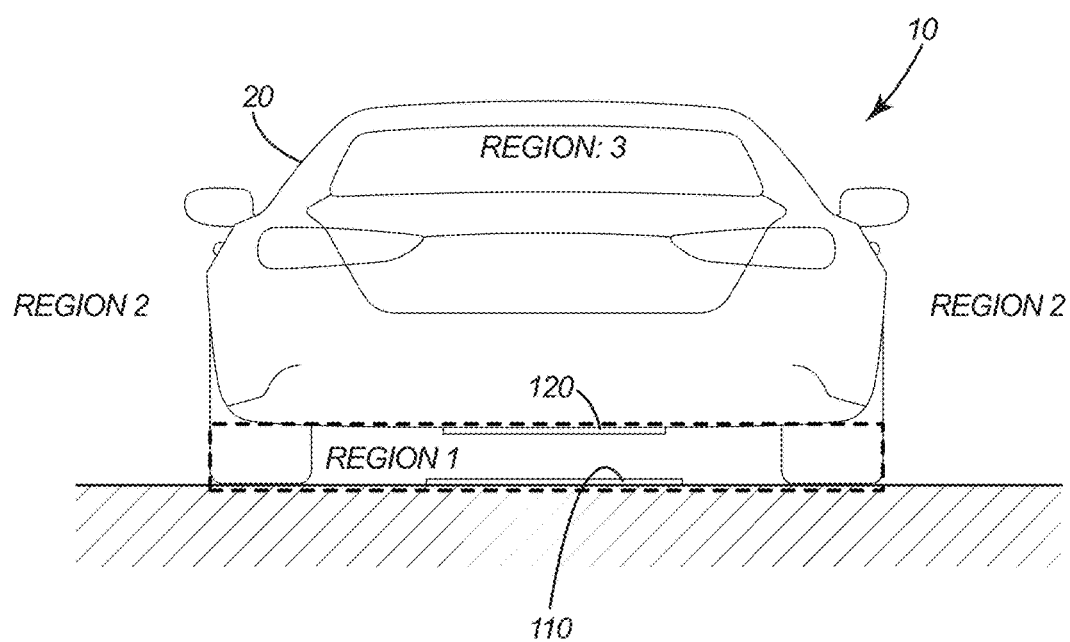
FIG. 3 shows a wireless power system including regions of interest in accordance with one embodiment.

Field regions can be provided around and inside the vehicle 20 in accordance with the illustrated embodiment of FIG. 3. A first region 1 may be defined under the vehicle 20. This region may not be subject to regulatory limitations, or may be subject to less stringent regulatory limitations. A second region 2 may be defined proximal to the sides of the vehicle 20 and subject to regulatory limits corresponding to a public region. A third region 3 may be defined inside the vehicle 20, and may be subject to regulatory limitations, such as a limit of 15 µTrms.

In the illustrated embodiment of FIG. 3, test planes may be defined at 800 mm away from the center of the wireless power receiver 120, in region 2, where a limit of the MFE may be defined as 27 $\mu T_{rms}$. With an X-Y-Z origin and vertical Z-axis disposed at the center of the wireless power transmitter 110, two observation points may be selected along the x- and y-axis at 800 mm away from the origin. The two observation points are denoted as $P_F$ and $P_S$ in the illustrated embodiment of FIG. 5, which depicts a wireless power coupler 100 in accordance with one embodiment.

The ZX plane through the $P_S$ point and YZ plane through the $P_F$ point, in the illustrated embodiment, are referred as an S-plane (side) and an F-plane (front), respectively.

The vehicle 20, or other type of object, may include structural components that operate as shielding for field emmissions. For instance, the vehicle 20 may be an EV with an undercarriage made primarily from high-strength steel and aluminum alloy. This undercarriage may act as a conductive shield for the magnetic fields. For purposes of disclosure, a structural component that operates as shielding for field emissions is provided in the illustrated embodiment as an aluminum shield 130, which may be any type of metal-based shield and is not limited to being an aluminum shield. In other words, the aluminum shield 130 depicted in the illustrated embodiment may correspond to shielding aspects of the vehicle 20, itself. The aluminum shield is depicted as a 1 m×1 m×0.7 mm large aluminum plate disposed above the wireless power receiver 120.

The wireless power coupler 100 and illustrated embodiment includes a wireless power receiver 120 that includes one or more of the following in addition to the aluminum shield 130: a backing 132, a core 134, and a receiver coil 122. The backing 132 may be a backplate, such as an aluminum backplate or other type of metal-based backing, that is disposed between the aluminum shield 130 and the receiver coil 122. The core 134 may correspond to one or more ferrite cores, and may be disposed between the receiver coil 122 and the backing 132.

The receiver coil 122 in the illustrated embodiment is a DD-type of coil operable to inductively couple with a transmitter coil 112 of the wireless power transmitter 110 for receipt of wireless power therefrom. The transmitter coil 112 also a DD-type of coil in the illustrated embodiment, and configured to transfer power wirelessly to the receiver coil 122. Although described primarily as a receiver coil 122 and a transmitter coil 112, these components may be described differently. For instance, the receiver coil 122 may be described as a secondary coil, and the transmitter coil 112 may be described as a primary coil.

As described herein, one or both of the receiver coil 122 and the transmitter coil 112 may be configured differently and are not limited to a DD-type of coil configuration.

Figure 5:
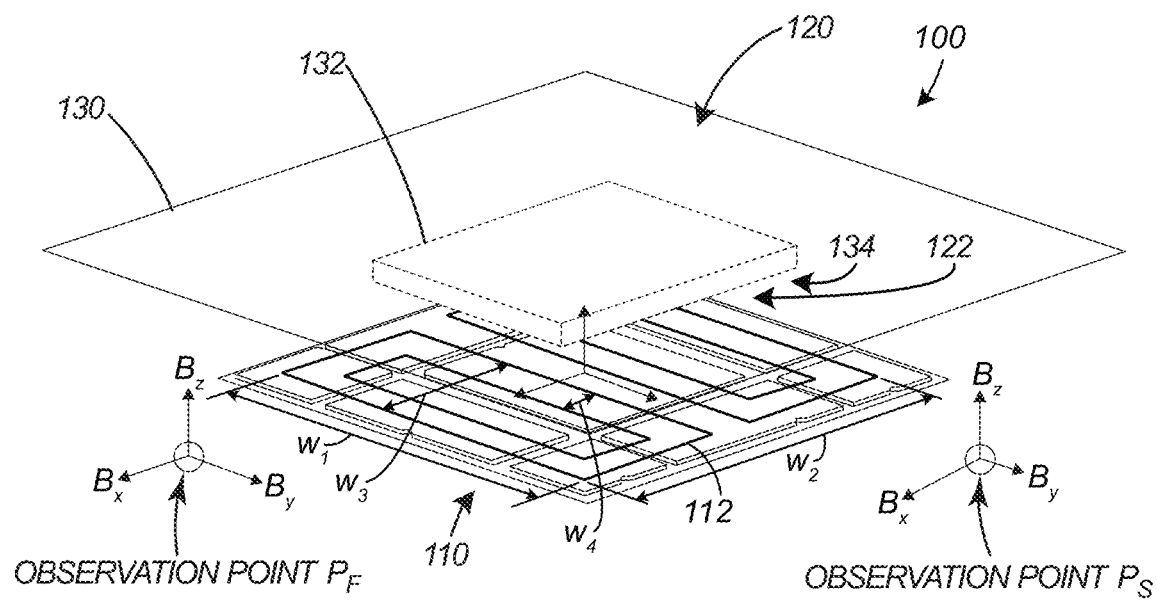
FIG. 5 shows a wireless power coupler in accordance with one embodiment.
Figure 8:
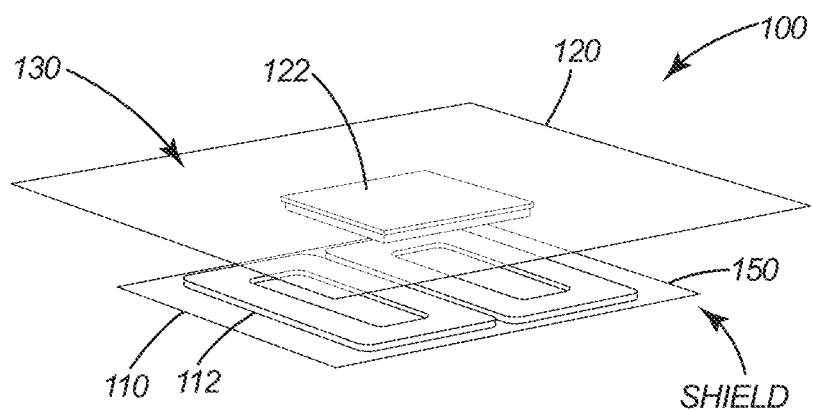
FIG. 8 shows a wireless power coupler in accordance with one embodiment.
Figure 9:
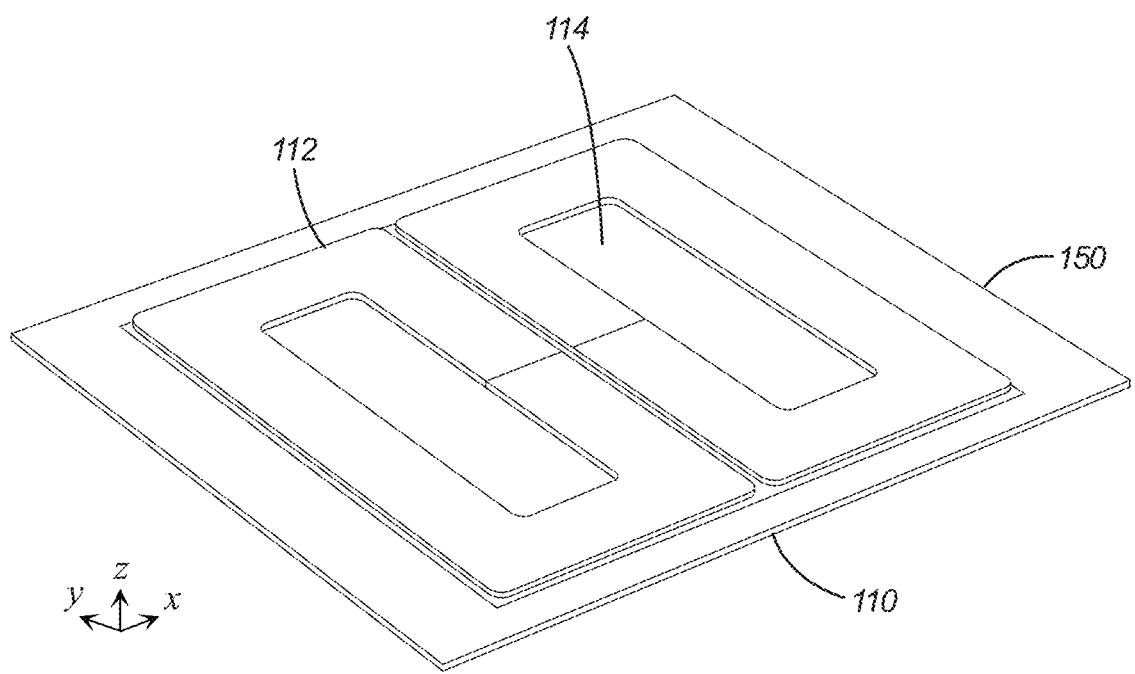
FIG. 9 shows a wireless power transmitter in accordance with one embodiment.

The wireless power coupler 100 in illustrated embodiment of FIG. 5 is described herein for discussion purposes with respect to a WPS 10 capable of transferring 11 kW. A finite element analysis (FEA) model of the 11 kW system is shown in FIGS. 6A-6B, under aligned and misaligned conditions, without shielding in accordance with one more embodiments of the present disclosure. The analysis is provided as a baseline to identify the effects of shielding the wireless power coupler 100 in accordance with one or more embodiments of the present disclosure.

The two main observation points, $P_S$ and $P_F$, shown in FIG. 5 indicate the position at the side and front of the vehicle 20, respectively, for the FEA model of the wireless power coupler 100 depicted in FIG. 5. For purposes of analysis, both the primary and secondary currents can be equally increased to maintain the same power transfer with reduced coupling under misalignment. FIGS. 6A and 6B show that the MFE at the front of the vehicle 20 may be approximately twice the MFE at the sides. Moreover, the illustrated embodiments and analysis indicate that under certain conditions, a peak MFE of 20.07 µT may be provided at an aligned position and a peak MFE of 39.36 µT may be provided at the misaligned position. The misaligned configuration in this analysis exceeds a target threshold set by a regulatory authority.

The MFEs and their vector components $B_x$, $B_y$, and $B_z$ on the S-plane and F-plane are shown in FIGS. 7A-D. The results show that $B_x$ and $B_y$ are the two most dominant components in the regions of the wireless power coupler 100. Because of the horizontally dominant MFE components, the aluminum shield 130, by itself, is considered ineffective for the wireless power coupler 100. A high-permeability MS may be provided in accordance with one embodiment of the present disclosure to provide more effective shielding for the DD-coils of the transmitter coil 112 and the receiver coil 122. For instance, a high-permeability path of an MS may provide a low-reluctance route for such stray magnetic fields and facilitate reducing the MFE.

The vector components of the MFE at $P_S$ and $P_F$ indicate that the wireless power coupler 100 without shielding aspects in accordance with one embodiment in the present disclosure may have significantly larger $B_x$ components than $B_y$ and $B_z$, at both $P_F$ and $P_S$.

As described herein, the real and imaginary components of a complex representation of the MFE may be determined to identify a contribution from the wireless power transmitter 110 and the wireless power receiver 120. In one embodiment, more than 95% of the total MFE may be determined as being generated by the wireless power transmitter 110. Because the wireless power transmitter 110 has a larger contribution to the MFE, shielding aspects described herein may focus on structure of the wireless power transmitter 110. However, it is to be understood that one or more aspects described in conjunction with the wireless power transmitter 110 may be incorporated into the wireless power receiver 120.

III. Shield Construction for DD-type Coils

Each DD-type coil of the wireless power transmitter 110 and the wireless power receiver 120 may include a clockwise winding and a counterclockwise winding, which are series-connected. These windings may carry the same current in opposite directions. Therefore, the z-components of the MFE from these two windings cancel each other to a large extent, resulting in a small $B_z$. The flux linking between the two windings may generate a horizontally aligned flux emission in the air, which contributes to the MFE.

For clarity of the comparison, the shielding effectiveness (SE) at any point relative to the DD-type coil may be represented in terms of the relative flux density as:

$$_{sh-1}SH_{sh-2} = \frac{B_{sh-2}}{B_{sh-1}} \tag{15}$$

where $_{sh-1}SE_{sh-2}$ is the SE of shield sh-2 with respect to a reference shield sh-1, $B_{sh-1}$ is the magnetic flux density at the observations point with shield sh-1, and $B_{sh-2}$ is the magnetic flux density at the same point with shield sh-2.

In contrast to the MFE of the unipolar pads or coil arrangements (e.g., a single circular or rectangular coil), the MFE of the bipolar DD-type coil arrangement has dominant x- and y-components. For this reason, the aluminum shield 130, by itself, is considered ineffective for effectively suppressing the MFE of the bipolar DD-type coil. A shield 150 in accordance with one embodiment of the present disclosure may be the wireless power transmitter 110 to facilitate suppression of MFE, particularly with respect to bipolar DD-type coil arrangement.

Three different wireless power coupler 100 configurations can be analyzed to facilitate discussion of shielding effectiveness for the shield 150 described herein. It is noted that aluminum aspects of the vehicle 20 in one embodiment may be ineffective shielding components. For example, the addition of a backing 132 formed of aluminum may slightly increase the MFE compared with a construction without any aluminum. And, instead of suppressing the MFE, the aluminum shield 130 may increase the MFE even more than the backing 132. On the other hand, a large MS disposed above the wireless power receiver 120 may significantly reduce the MFE of the DD coil-based wireless power coupler 100. Although the large MS disposed above the wireless power receiver 120 may reduce the MFE, this shield is large in area and more costly to incorporate into the wireless power coupler 100 relative to the shield 150 described herein in accordance with one embodiment.

Turning to the illustrated embodiment of FIGS. 8-11, the wireless power coupler 100 in accordance with one embodiment is shown including a shield 150. The wireless power coupler 100 includes a wireless power receiver 120 and a wireless power transmitter 110. The wireless power receiver 120 may be configured similar to the wireless power receiver 120 described in conjunction with the illustrated embodiment of FIG. 5, including the shield 130 and the receiver coil 122.

The wireless power transmitter 110 and illustrated embodiment includes a transmitter coil 112, which is a DD-type coil arrangement, and a transmitter core 114. The transmitter core 114 may include one or more core components, such as one or more ferrite core components. A transmitter backing 116, such as an aluminum backplate, may be provided and arranged such that the transmitter core 114 is sandwiched between the transmitter coil 112 and the transmitter backing 116.

In one embodiment, the transmitter coil 112, the transmitter core 114, and the transmitter backing 116 may be partially or entirely encased within packaging 118. The material of the packaging 118 may vary depending on the application, and may include for instance a polymer-based material.

The wireless power transmitter 110 may include a shield 150 as described herein. The shield 150 may be constructed in the form of a frame or border with the internal aperture. The shield 150 may include an outer perimeter and an inner perimeter defined by the internal aperture. The shield 150 may include one or more layers; however, for purposes of disclosure, the shield 150 is shown as a single layer in the illustrated embodiment of FIGS. 8-11.

Figure 11:
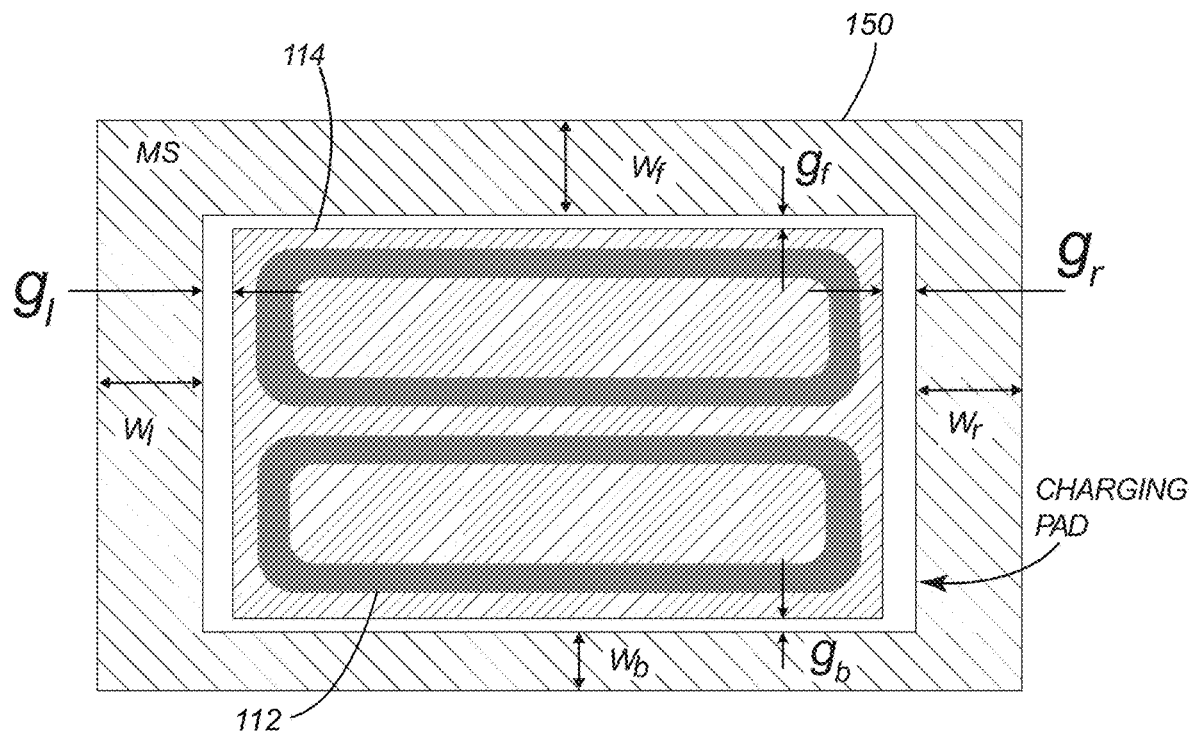
FIG. 11 shows a top view of the wireless power transmitter in accordance with one embodiment.

In the illustrated embodiment, the shield 150 includes four sides, a front, back, left, and right side, each defined by respective widths w_f, w_b, w_l, w_r. In FIG. 11, an outer perimeter of the core 114 can be seen relative to an inner perimeter of the shield 150. At each side of the shield 150, a gap may be provided between the inner perimeter of the shield 150 and the outer perimeter of the core 114. These gaps are designated as g_f, g_b, g_l, g_r, and are associated respectively with the front side, the back side, the left side, and the right side of the shield 150. The gaps g_f, g_b, g_l, g_r may be different from each other depending on the configuration, as described herein. The gap sizes may be varied as a function of analysis of the wireless power coupler 100.

It is noted that the overall width and length of the shield 150 may be defined as a function of the size of the core 114, the gaps g_f, g_b, g_l, g_r, and the border widths w_f, w_b, w_l, w_r. For instance, the wider the core 114, the greater the gaps g_l, g_r, and greater the border widths w_l, w_r, the longer the overall of length of the shield 150. The overall width of the shield 150 may be determined similarly with respect to the gaps g_f, g_b, the border widths w_f, w_b, and the wider the width of the core 114, the wider the overall width of the shield 150. It is further noted that the size of the core 114 may be dependent on the size of the transmitter coil 112.

In the illustrated embodiment of FIG. 11, the gaps g_f, g_b, g_l, g_r are shown forming a space between the outer perimeter of the core 114 and the inner perimeter of the shield 150. In one embodiment, portions of the inner perimeter of the shield 150 may overlap portions of the outer perimeter of the core 114. This overlap can be seen in the illustrated embodiment of FIG. 10, where the right side of the shield 150 overlaps a portion of the core 114. In one sense, the gap g_r may be considered a negative dimension—e.g., a positive gap dimension indicates space between the core 114 and the shield 150, and a negative gap dimension indicates overlap between the core 114 and the shield 150.

In addition to varying parameters such as a) the gap between one or more areas of the core 114 and an inner perimeter of shield 150 and b) the width of one or more portions of the shield 150, one or more additional or alternative parameters associated with the shield 150 may be varied in an effort to enhance suppression of field emissions. For instance, a thickness of the shield 150 may vary depending on the application.

In one embodiment, a core 114 may be absent, and the parameters described herein with respect to the shield 150 and the core 114 may be defined instead with respect to the transmitter coil 112 and the shield 150. For instance, the gap may be defined with respect to an overall outer perimeter defined by the two coils of the transmitter coil 112 in the form of a DD-type coil and an inner perimeter of the shield 150. Alternatively, the core 114 may be present but parameters of the shield 150 may be defined based on construction of the transmitter coil 112, alone or in conjunction with the construction of the core 114.

The shield 150 may be constructed of a high permeability magnetic material. It is to be understood, however, that the material of the shield 150 may vary depending on the application.

In one embodiment, a wireless power coupler 100 having a shield 150 may be configured for a lower power range (<20 kW), and in such configurations, either the transmitter- or receiver-side may include a shield 150. For higher-power (>20 kW) applications, both the transmitter and receiver sides may include the shield 150 in an effort to suppress the MFE below regulatory limits. As described herein, for purposes of disclosure, the shield 150 is described in conjunction with the transmitter side. However, it is to be understood that the shield 150 may be provided on the receiver side and incorporated into the wireless power receiver 120.

There are a variety of parameters of the shield 150 that may be varied depending on the target shielding effectiveness (SE) and power level. The width, thickness, and the gap of the shield 150 around the core 114 may determine the SE. Considering charging modes for the vehicle 20, a target SE on the left and right are the same, yielding $w_r = w_l$ and $t_r = t_l$, where t_r and t_l correspond to thickness of the shield 150 on the right and left side, respectively. The width and thickness along the front and back of the shield 150 may depend on the mounting position of the wireless power receiver 120. If the wireless power receiver 120 is mounted near the front-end of the vehicle 20, the target SE for the front side may be higher than the backside and vice versa. For purposes of disclosure, a generalized configuration as discussed in which 800 mm clearance is provided on the sides and the front. However, it is to be understood that different clearances may be defined depending on the application.

Figure 10:
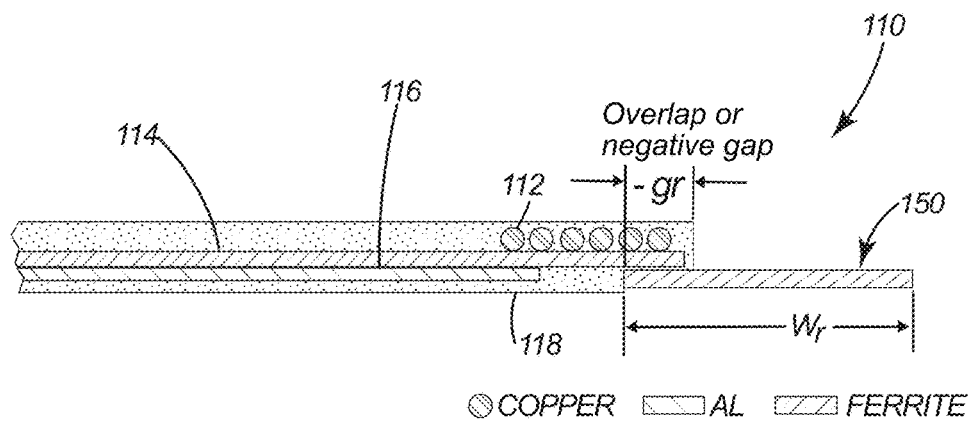
FIG. 10 shows a sectional, partial view of a wireless power transmitter in accordance with one embodiment.

The gap between the core and the MS ($g_f$, $g_b$, $g_l$, and $g_r$) critically affects the SE. The subscript f, b, l, and r indicates the direction from the charging pad to the vehicle's front, back, left, and right, as shown in FIG. 10.

A. Gap Between Core and Shield on the Front and Back: $g_f$, $g_b$

The $g_f$ and $g_b$ of the construction of the shield 150 may affect MFE. For instance, high sensitivity of the MFE may be realized at the lower range of the gaps (0-20 mm). Accordingly, keeping the core continuously extended with $g_f = g_b \approx 0$ (or potentially a negative gap dimension that yields overlap) may be helpful to achieving a high SE and suppressing the MFE.

It is noted that extending the core 114 outside the outer perimeter of the transmitter coil 112 may be practically challenging. The shield 150 may be provided in the form of a separate MS layer that can be extended with a certain overlapping region between the core and the shield 150, as shown in FIG. 10. This approach may enable packaging the shield 150 within the same enclosure as the remaining components of the wireless power transmitter 110. The primary target for varying the gaps is to provide a low reluctance return path to the leakage flux of the wireless power transmitter 110.

B. Gap Between Core and Shield on the Sides: $g_l$, $g_r$

The $g_l$ and $g_r$ of the shield 150 may also affect MFE. For instance, a similar sensitivity characteristic may be identified in placing a ferrite strip next to the core 114 without any gap. This appears to have a meaningful impact on MFE reduction. The sensitivity of the MFE with gi, $g_r$ is comparatively higher than the sensitivity with $g_f$, $g_b$. As a result, layers that form the shield 150 may be disposed adjacent to the core-ferrite (e.g., the core 114) with a minimum gap, a reduced gap, or an overlapping region may be effective in suppressing MFE.

C. Width and Thickness of the Shield

The width and thickness of the shield 150 may affect the SE and the shield loss. For instance, in one embodiment, with a 100 mm wide ferrite around the core 114, the MFE may be reduced to 10.6 $\mu T_{rms}$, compared with 22 $\mu T_{rms}$ without any shield. Considering the 27 $\mu T_{rms}$ limit of some regulatory authorities, this arrangement of the shield 150 is considered effective. Because the MFE increases at misaligned conditions, by maintaining the MFE well below the regulatory limits at aligned conditions, the likelihood of exceeding regulatory limits at misaligned conditions may be reduced significantly.

The width of the shield 150 may be increased to achieve an even higher SE. The shielding targets along the front, back, left, and right sides may depend on an installation location of the wireless power coupler 100. The MFE for the transmitter coil 112 (or the receiver coil 122 or both) in the form of DD-type coils may be approximately twice around the front and back of the wireless power transmitter 110 and the wireless power receiver 120 compared with the sides, which can affect shield construction if the front clearance is about the same as the sides.

D. Transmitter Vs Receiver Side MS

As described herein, the shield 150 can be provided on both the transmitter and receiver side. A single-sided shield construction can be sufficient for lower power systems, such as an 11 kW WPS 10. A double-sided shield construction (e.g., a shield 150 in the wireless power transmitter 110 and a shield 150 and the wireless power receiver 120) may be utilized for higher power applications, such as applications greater than 11 kW.

Because the shield 150 may include additional material and add cost to the wireless power coupler 100, and increase effective size, a transmitter side shield construction without a receiver side shield construction may be utilized in lower power applications. The wireless power transmitter 110 may have comparatively less stringent limit on the size and weight. Moreover, the utilization of a wireless power transmitter 110 on a charging station by multiple vehicles 20 is often much higher than a wireless power receiver 120. As a result, a transmitter-side only shield arrangement may be preferable over a transmitter side and a receiver side shield arrangement. However, for a high-power WPS 10 and to enable enhanced interoperability, both transmitter and receiver side shield arrangements may be specified.

E. Shield Material

The shield 150 may be constructed to provide a low-reluctance and low-loss path for magnetic flux. In addition, the weight and volume of the shield 150 may be considered for applications. Ferrite, nanocrystalline, or magment, or a combination thereof, may be utilized as magnetic materials for the shield 150. The relative permeability of the low-frequency (<500 kHz) ferrites and nanocrystalline ranges from 500 to 6000, and 100- to 150000, respectively. The relative permeability of the magment is only 40. While those materials show a widely different relative permeability, most of those may be found highly effective for construction of the shield 150.

Ferrite tiles may be used as shield material. However, it is noted that ferrites are highly brittle, which can affect reliability of EV applications.

Magment may be utilized for the shield 150, as described herein, and can be cast into a target geometry. Magment may enable easier installation in a variety of applications, such as within the pavement of the parking area. It is to be understood that the shield 150 may be readily separable from other aspects of the wireless power transmitter 110 or the wireless power receiver 120. For instance, the transmitter coil 112, the core 114, and the packaging 118 may be readily separable from the shield 150.

Although Magment or ferrites, or both, may be utilized for construction of the shield 150 (e.g., a shield 150 of the wireless power transmitter 110), nanocrystalline materials may be a potential alternative or supplemental material for the shield 150. For instance, nanocrystalline materials may be incorporated into the shield 150 of the wireless power receiver 120. Using multiple layers of narrow nanocrystalline ribbons, a flexible and thin layer of shielding can be constructed. For the nanocrystalline-based shield, the eddy current path may be controlled by a geometric modification to limit the loss.

F. Selection of Shield Parameters

The shield 150 may be configured to suppress the MFE below a regulatory limit. However, there are tradeoffs in configuring the shield 150 for a particular application. For instance, overdesigning for an excessive SE may yield a higher volume of shield material and increase the cost and complexity. Moreover, the shield 150 includes additional weight, and may affect the overall efficiency, either positively or negatively, depending on the shield construction. Considering various goals and constraints, a multi-objective optimization analysis may be conducted in accordance with one embodiment to suppress the MFE to a certain threshold while also adding the least amount of additional loss and material as follows:

$$\Phi = \begin{cases} c_1 \left( \frac{B_{P1}}{B_{th1}} - 1 \right) + \\ c_2 \left( \frac{B_{P2}}{B_{th2}} - 1 \right) + \\ c_3 \left( \frac{B_{MS}}{B_{th3}} - 1 \right) \end{cases} \quad (16)$$

where $\Phi$ is the set of cost functions for minimization, $B_{th1}$, $B_{th2}$, and $B_{th3}$ are the target values, and $c_1$, $c_2$, and $c_3$ are the weights of the maximum flux density at $P_F$, $P_S$, and in the MS, respectively. The variables for the optimization analysis may include the gaps g_f, g_b, g_r, g_l, widths w_f, w_b, w_r, w_l, and thicknesses t_f, t_b, t_r, t_l of the shield 150.

The threshold flux densities in Eq. 15 may be determined by the constraints of the MFE and the shield material. The limit of $B_{th1}$ and $B_{th2}$ may be determined by the MFE limits under consideration and a worst-case operating condition. For instance, a limit for the MFE may be 27 $\mu T_{rms}$ for a vehicle 20. Alternatively, a limit for the MFE may be 15 $\mu T_{rms}$ for people carrying medical implant devices such as pacemakers. The choice of threshold may depend on the application and target conditions.

The choice of $B_{th3}$ may be determined by the shielding material and the operating frequency and temperature limit imposed on the shield 150. In one embodiment, FR438081IC core may be used as the shield 150. At 85 kHz, 150 mT may provide sufficiently low loss density to keep the temperature below 80° C. For a thinner shield 150, a higher threshold $B_{th3}$ (up to 250 mT) may be utilized while considering thermal design/packaging. Again, for a comparatively low-frequency operation, such as 20 kHz or 40 kHz, $B_{th3}$ can be higher up to 400 mT.

The choice of relative weight may indicate a design priority and affect the limits for $B_{th1}$, $B_{th2}$, and $B_{th3}$. In one embodiment, suppressing the MFE to a given limit may be of much higher priority than the loss in the shield 150. Based on these considerations and the operating condition, an optimization may be performed through FEA with c1=c2=0.4, c3=0.2, $B_{th1}=B_{th1}$=15 $\mu$Trms, and $B_{th3}$=150 mTpeak.

The effectiveness of the shield 150 in accordance with one embodiment may be compared against arrangement without the shield 150 for an 11 kW mismatched DD-coil system.

In this example, the receiver length and width are approximately half of the transmitter. Three different shield configurations may be evaluated with the 11 kW system: 1) a WPS 10 without a shield 150 and without the aluminum shield 130 (e.g., including the backing 132, 116, 2); 2) a WPS 10 without the shield 150 and including the aluminum shield 130 in the wireless power receiver 120; and 3) a WPS 10 including the shield 150 and the wireless power transmitter 110 and the aluminum shield 130 in the wireless power receiver 120. For each of the configurations, the MFE may be determined as follows:

TABLE II

COMPARISON OF SE

| Shield Configurations | Relative SE | SE at $P_F$ | SE at $P_S$ |
|---|---|---|---|
| +Al shielding 130 at Rx | $SE_{AlS}$ | 1.16 | 1.04 |
| +Shield 150 at Tx and +Al shielding 130 at Rx | $_{AlS}SE_{MS}$ | 0.30 | 0.30 |

As can be seen, compared to the unshielded WPS 10, the SE of the aluminum shield 130 is higher than one, indicating that, instead of suppressing, the aluminum shield 130 increases the MFE. Compared to the aluminum shield 130, the shield 150 shows a SE=0.3 both in the front and side of the vehicle 20. The shield 150 can be further enhanced to reduce the MFE to meet lower MFE target limits.

It is noted that the inductances of the primary and secondary coils changes with different shield configurations and alignment condition. The self- and mutual inductance under aligned and maximum misaligned conditions are provided in the table below. Such variation changes the resonance frequency and the current gain of the WPS 10. For purposes of discussion, the resonance frequency may be kept fixed at 85 kHz and only the currents through the coils may be increased to the transfer 11 kW output power under the maximum misaligned position.

TABLE II

MFE under Misaligned Positions at 11 kW Output Power

| | Aligned | | | Misaligned | | |
|---|---|---|---|---|---|---|
| Shield Configurations | Tx (μH) | Rx (μH) | M (μH) | Tx (μH) | Rx (μH) | M (μH) |
| 1) Unshielded WPS | 82.3 | 85.5 | 18.6 | 80.5 | 85.5 | 13.5 |
| 2) +Large Rx Al shield | 80.3 | 85.2 | 19.4 | 77.8 | 85.1 | 14.2 |
| 3) +Shield 150 - Tx MS | 81.9 | 85.2 | 19.3 | 79.4 | 85.2 | 14.1 |

IV. Shield Construction for a 3-phase WPS

Figure 12:
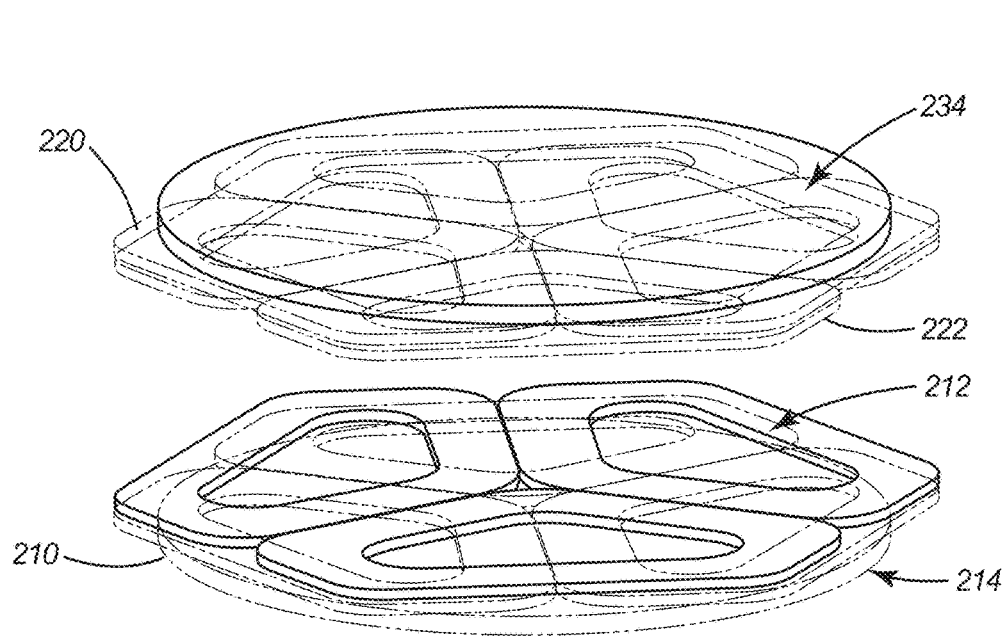
FIG. 12 shows a wireless power coupler in accordance with one embodiment.

A WPS 10 in one embodiment may include a polyphase configuration, including the wireless power coupler 200 depicted in illustrated embodiments of FIGS. 12-19. The wireless power coupler 200, as described herein, may include a wireless power transmitter 210 and the wireless power receiver 220. The wireless power coupler 200 in illustrated embodiment of FIG. 12 is configured in this manner, where each of the wireless power transmitter 210 and the wireless power receiver includes three bipolar coils 212, 222 backed by a ferrite core 214, 236. The three bipolar coils 212, 222 in each of the wireless power transmitter 210 and the wireless power receiver 220 may be placed 120 degrees rotated from each other. Parameters of the wireless power coupler 200 that affect analysis for purposes of determining field emissions, such as electric and magnetic field emissions, and shielding suppression analysis include the parameters identified herein in Table I.

Figure 13:
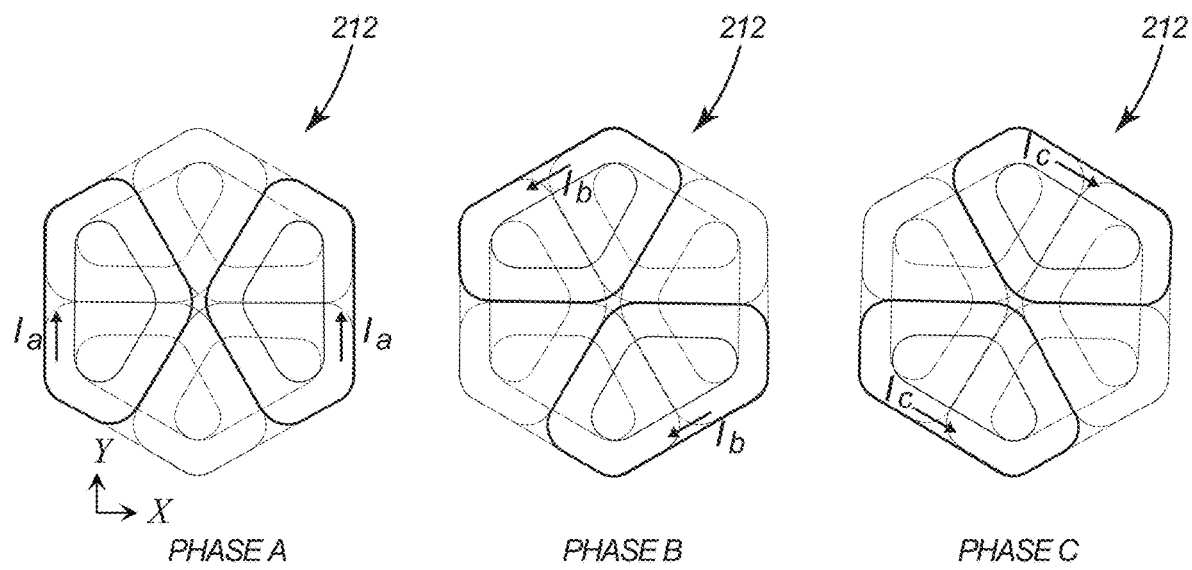
FIG. 13 shows a transmitter coil configuration and current flow through a wireless power transmitter in accordance with one embodiment.

The lumped coil geometry of Phase-A, B, and C of the wireless power transmitter 210 are shown in FIG. 13. To balance the inductance, each phase-coil 212 has one winding on the top-layer and one winding on the bottom layer. The current direction in the phase coils are indicated in FIG. 13.

Figure 14:
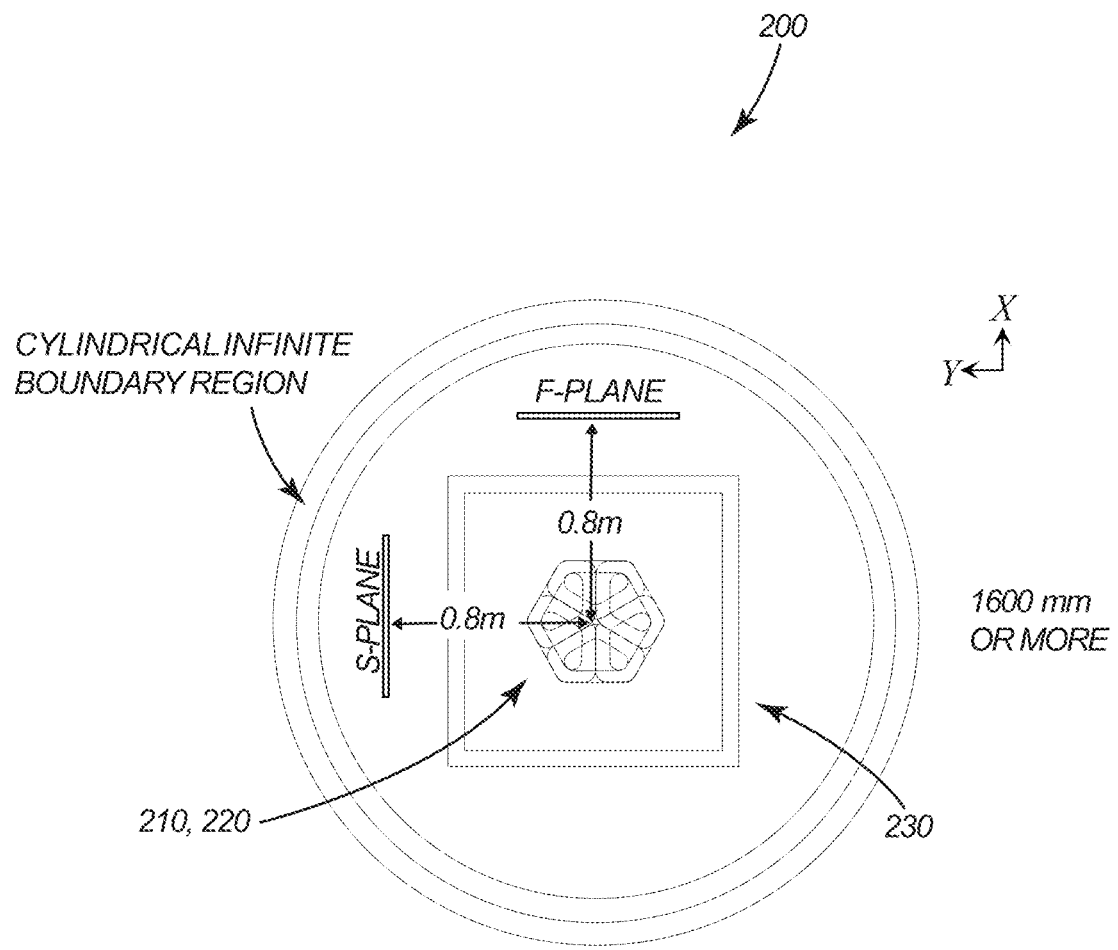
FIG. 14 depicts a wireless power coupler in accordance with one embodiment.

For investigating the magnetic field emission of the wireless power transmitter 210, analysis may be conducted for the MFE along a side (S-plane) and a front (F-plane) of the vehicle 20 at 80 cm away from the center of the wireless power receiver 220, as shown in the illustrated embodiment of FIG. 14. The magnetic field emission on an observation area can be determined and used as a basis for configuring a shield according to one or more embodiments of the present disclosure. In the illustrated embodiments, an aluminum shield 230 (which can be any type of metal-based shield) is provided to represent a structural aspect of the vehicle 20, or other type of object, similar to the aluminum shield 130 described herein in conjunction with alternative embodiments.

Figure 15A:
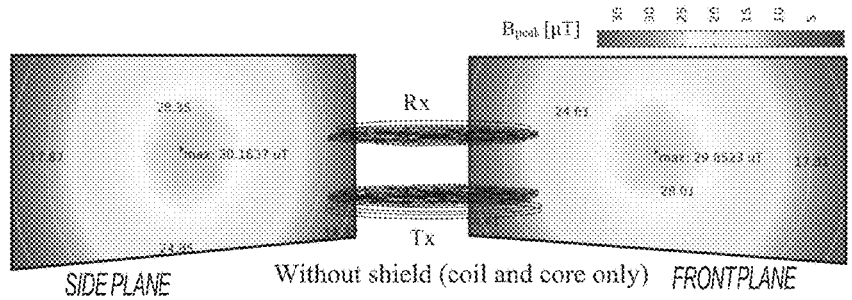
FIG. 15A shows MFE for a wireless power coupler without shield.
Figure 15B:
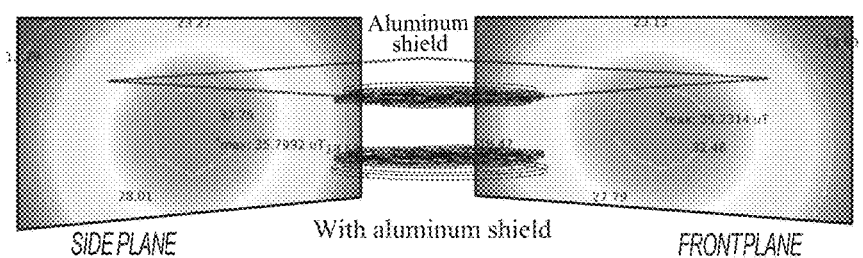
FIG. 15B shows MFE for a wireless power coupler including aluminum shield in accordance with one embodiment.

Analysis of the magnetic flux density on the S-plane and F-plane for a wireless power coupler 200 according to one embodiment without shielding is shown in FIG. 15A, which shows that the magnetic field at rated 50 kW power is 30.16 $μT_{peak}$, which is close to a regulatory limit of 38 $μT_{peak}$. As a result, a misalignment may potentially cause the system without shielding to exceed the regulatory limit.

The vector component of the peak flux density on the S-plane and F-plane can also be determined and analyzed. It is noted that the x- and y-components of the MFE are much stronger than the z-component on the observation planes, S-Plane and F-Plane. This pattern of flux density vectors of the 3-phase WPS 10 is similar to the flux density pattern of the single-phase bipolar coil-based WPS 10 described herein in conjunction with alternative embodiments.

Similar to the leakage field from a single phase bipolar WPS 10, the leakage field from a 3-phase WPS 10 has a dominant horizontal component in the magnetic field leakage. Therefore, the eddy current based aluminum shield 230, which cancels the normal component of the incident magnetic field, cannot cancel or suppress the horizontally dominant leakage magnetic field from the bipolar coils 212, 222. Rather, in one embodiment, a high-permeability magnetic material-based shield (MS) may be provided to guide the leakage magnetic field and reduce the emission. For instance, a ferrite-based shield is described herein to facilitate suppression of the leakage magnetic field from 3-phase WPS 10.

For purposes of comparison, the performance of a conductive material-based shield and a magnetic material-based shield in suppressing the MFE for a 3-phase WPS 10 is discussed in conjunction with the following, five shield configurations:

Configuration 1: WPS 10 without any aluminum shield 230,
Configuration 2: WPS 10 with a large aluminum shield 230 above the wireless power receiver 220,
Configuration 3: a large (1×1 m) shield 232 above the wireless power receiver 220,
Configuration 4: a large (1×1 m) shield 250 below the wireless power transmitter 210,
Configuration 5: two shields 232, 250, one above the wireless power receiver 220, one below the wireless power transmitter 210.

Analysis of these configurations and resulting magnetic flux density on the S-plane and F-plane is shown respectively in FIGS. 15A-E. As can be seen, the MFE of the WPS 10 with the aluminum shield 230, which represents a structural component of the vehicle 20, increases the MFE by 18% relative to the WPS 10 without any aluminum shield or magnetic material-based shield.

Figure 15C:
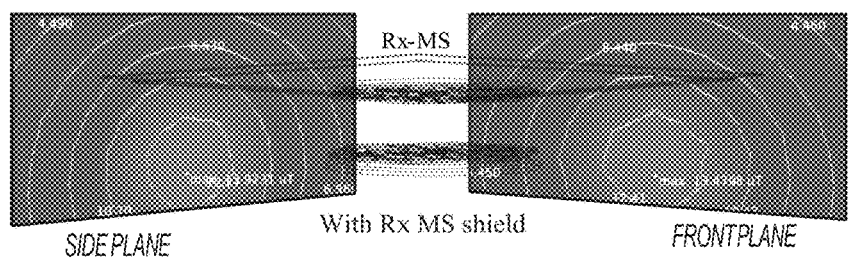
FIG. 15C shows MFE for a wireless power coupler including a shield provided in a wireless power receiver in accordance with one embodiment.
Figure 15D:
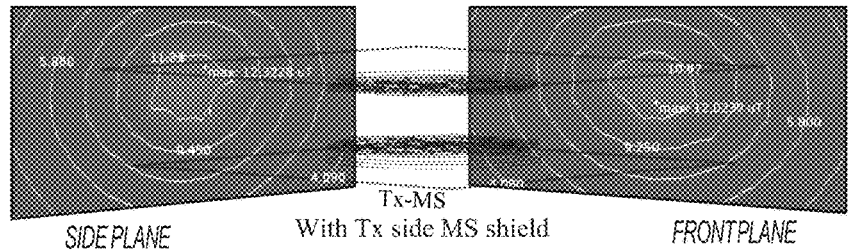
FIG. 15D shows MFE for a wireless power coupler including shield provided in a wireless power transmitter in accordance with one embodiment.
Figure 15E:
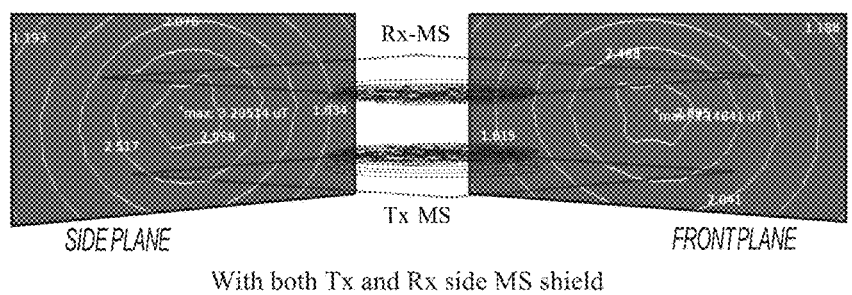
FIG. 15E shows MFE for a wireless power coupler including shields provided in a wireless power receiver and a wireless power transmitter in accordance with one embodiment.

FIG. 15C shows the MFE for Configuration 3, where a high-permeability magnetic material-based shield 232 is placed between the wireless power receiver 220 and the aluminum shield 230. It can be seen that the receiver side shield 232 has suppressed the MFE by more than 50% compared to the aluminum shield 230. The MFE for Configuration 4 with a transmitter side shield 250, as shown in FIG. 15D, provides a similar shielding effectiveness. Finally, the MFE for Configuration 5 with both transmitter and receiver side shields 250, 232 shows a drastic reduction of the MFE, as shown in FIG. 7E. If implemented on both sides, shields 232, 250 reduce the MFE by more than 90% compared to the MFE of aluminum shield 230 of Configuration 2.

The flux density along the y-axis (half-way between the transmitter and receiver) is worth mentioning in further detail relative to the aluminum shield 230. Specifically, the aluminum shield 230 does not suppress the leakage magnetic flux near 80 cm radius, which is around the sides of the vehicle 20. Instead of reducing MFE, the aluminum shield 230 increases the leakage flux around the vehicle 20 and increases the MFE. However, it is noted that the aluminum shield 230 is useful under other operating conditions, because, the aluminum shield 230 is cost-effective, flexible, and it protects the vehicle undercarriage from a high magnetic field. Therefore, in some implementations, a magnetic material-based shield 250, 232 according to one embodiment can be provided in conjunction with a large aluminum shield 230 under the vehicle 20.

As described herein, a magnetic material-based shield 250, 232 on one-side may reduce the leakage MFE significantly. The magnetic material-based shield 250, 232 on both sides may reduce the MFE even more, potentially bringing it much below regulatory limits. The magnetic material-based shield 250, 232 has the potential to suppress the MFE below the regulatory limit for an even higher power WPS 10. However, the magnetic material-based shield 250, 232, which can be made with ferrite, nanocrystalline, or similar high permeability material, is comparatively less convenient and more costly than the conductive aluminum shield 230. Therefore, the geometry of the magnetic material-based shield 250, 232 may be varied, in accordance of with one or more embodiments described herein, based on target constraints for volume and loss in the shield 250, 232. For instance, the Configurations 2-5 described herein include a shield 250, 232 that is large and yield effective field suppression, the shields 250, 232 are 1×1 m in size and considered large. The shield 250, 232, as well as other shields described herein, may be reconfigured according to constraints, such as volume and shield loss, in order to yield a shield construction that provides effective suppression of field emissions while complying with the one or more constraints.

For a mismatched wireless power coupler 100, 200, where commonly the wireless power transmitter 110, 210 is much larger than the wireless power receiver 120, 220, the shielding target may be different for the wireless power transmitter 110, 210 and the wireless power receiver 120, 220. In such case, both the transmitter and receiver side shields 250, 232 may be developed together to yield optimal or enhanced results. Moreover, in the realm of vehicle charging, the flexibility of installing a shield 250 to the ground side (i.e., a wireless power transmitter 210) and vehicle side (i.e., the wireless power receiver 220) is different, and this factor may affect development of both the shield 250 for the wireless power transmitter and the shield 232 for the wireless power receiver.

The flux density distribution at the transmitter and receiver side shields 250, 232 may be determined based on a parametric analysis of shield area and the wireless power coupler 200. Construction of the transmitter and receiver side shield 250, 232 may be based at least in part on more than one shield layer being provided. For example, according to one embodiment, the transmitter and receiver side shield 250, 232 may be constructed as one layer of a two or more layer high-permeability magnetic shield configuration. A shield layer 1 (SL-1) may correspond to the transmitter or receiver side shield 250, 232, depending on analysis of the shield layer 1 with respect to the receiver side of the transmitter side. Accordingly, the shield layer 1 may be designated as SL-1, 250, or 232.

The SL-1 250, 232 may be located around the transmitter or receiver coil 212, 222, with an airgap (potentially a minimum air gap) relative to the respective receiver or transmitter core 214, 236 (e.g., a core-ferrite). The SL-1 250, 232 may be shaped in a manner similar to the overall outer-shape of the transmitter or receiver coil 212, 222. For purposes of discussion, the SL-1 250, 232 is shown as being circular for a hexagonal configured wireless power coupler 200. The thickness of the SL-1 250, 232 may range from about ½ to ⅓ of the thickness of the respective transmitter or receiver core 214, 236.

Figure 16:
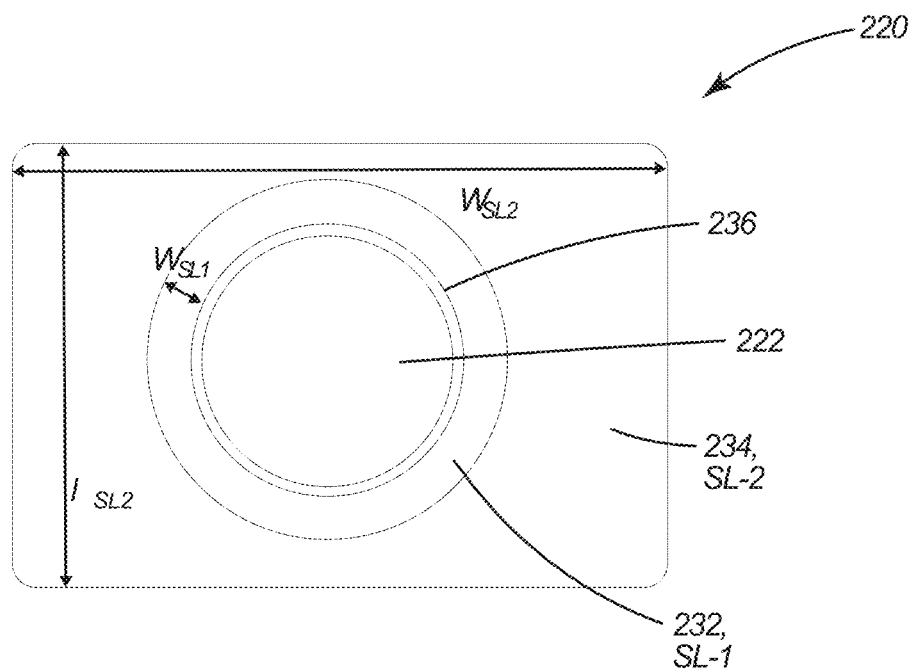
FIG. 16 depicts a wireless power receiver in accordance with one embodiment.

The shield construction in accordance with one embodiment may include a second shield layer 234, shown in conjunction with the wireless power receiver 220 depicted in FIG. 16. It should be understood that the second shield layer 234 may be incorporated into the wireless power transmitter 210, which is depicted for discussion purposes in FIG. 17 without the second shield layer 234. The second shield layer 234 may be designated herein as SL-2 and 234.

The SL-2 234 in the illustrated embodiment of FIG. 16 spans around the SL-1 250, 234. The SL-2 234 is comparatively larger and thinner than the SL-1 250, 234. The width and length of the SL-2 234 may be dominated by the width of the vehicle 20 and the relative position of the wireless power coupler 200.

In one embodiment, in a vehicle 20, the wireless power receiver 220 may have less side-to-side clearance than front and back clearance. A higher side-to-side misalignment may be allowed under certain regulatory conditions compared to back-and-forth misalignment. Considering these criteria, the width of the SL-2 234 (along vehicle's side-to-side) may be larger than its length.

It is noted that the field intensity in SL-2 234 may be lower than the field intensity in SL-1 250, 234. Accordingly, the thickness of SL-2 234 may be relatively lower than the thickness of the SL-1 250, 232.

As described herein, SL-2 234 is optional, and its presence may depend on a variety of factors, such as the power level and shielding targets. The wireless power receiver 220 in the illustrated embodiment of FIG. 16 includes both SL-1 and SL-2, and the wireless power transmitter 210 in the illustrated embodiment of FIG. 17 includes SL-1 only. A wireless power coupler 200 including a wireless power receiver 220 and the wireless power transmitter according to the illustrated embodiments may be effective for a mismatched system with a larger wireless power transmitter 220.

A shield construction in accordance with one embodiment of the present disclosure may be configured to suppress the MFE on the S-plane below a regulatory limit, which may be determined according to the following:

$$\Phi = \text{abs}\left(\frac{B_{MFE}}{B_{ref} + B_{buffer}} - 1\right)|_{S-plane} \quad (17)$$

where $B_{MFE}$ is the MFE, and $B_{ref}$ is the regulatory limit on the flux density and $B_{buffer}$ is an additional buffer (potentially provided to enhanced safety). To meet the regulatory limits limit, the $B_{ref}$ is 38 $\mu T_{peak}$ for generally accessible area and 21.2 $\mu T_{peak}$ for pacemaker compatibility.

A. Constraints

The core volume and the total loss are the two constraints identified for generating a shield construction for a wireless coupler 200 for a WPS 10 in accordance with one embodiment. To refine optimization or enhancement of the shield construction for loss and volume, a target flux density may be identified for the core 214, 234. For the high-power ferrite cores 214, 234, 150 $mT_{peak}$ flux density may be selected as a target flux density in the core 214, 234 considering a loss-density at 85 kHz. After the target flux density is set for the core 214, 234, the minimum core thickness can be determined at different positions for a certain core geometry, and the core geometry may be determined to reduce or minimize the MFE.

One or more of the size, thickness (t), pattern, and material properties of the shield construction may be utilized as factors or constraints in determining shielding performance and construction. In one embodiment, a discrete optimization process may provide global optimization thorough evaluating a larger number of discrete geometric patterns. In addition to or alternative to the discrete optimization process, for a fully FEA based optimization, first, a limited number of geometric patterns may be selected based on the flux density distribution of the WPS 10. Then a parametric optimization of the best performing geometry may provide an even more optimized system. As an example, an FEA based approach, utilized to generate a shield construction according to one embodiment, may be based on the following parameters:

TABLE IV

OPTIMIZATION PARAMETERS AND CONSTRAINTS

| Optimization parameters | Parameter to be optimized under: | | |
|---|---|---|---|
| | max. misaligned condition | Alignment condition | Limits |
| Core volume | | $V_{SL-1} + V_{SL-2} + V_{SL-3}$ | $<V_{ref}$ |
| Core flux density | | $B_{peak}$ in SLs | ~150 mT |
| Properties of SL-1 | $w_{SL-1}$ * | $w_{SL-1}, t_{SL-1},$ | |
| Properties of SL-2 | $w_{SL-2}, l_{SL-2},$ | $t_{SL-2}$ | |

* If only SL-1 is used for shielding

Construction of the magnetic-material based shielding may be conducted under both a nominal condition and a maximum range of operating conditions considering misalignment, airgap, and power. The maximum airgap and misalignment may provide the lowest coupling coefficient and may involve a maximum current through the coil 212, 222 for a target power. The WPS 10 may be run at a lower power under high misalignment conditions due to the current limit of the coil 212, 222, the minimum acceptable efficiency, and thermal constraints. For purposes of disclosure, the nominal currents of the coils 212, 222 are identified as constraints for the misaligned condition. Under this framework, in one embodiment, the misalignment along the y-axis may be identified ±100 mm and along the x-axis was ±75 mm and the currents through the coils 212, 222 are the same.

The MFE of a WPS 10 increases and the flux density in the core 214, 234 decreases under a misaligned condition. As a result, the optimization process according to one embodiment may be conducted under maximum misaligned conditions to guide the overall span of the shield construction to reduce the MFE. And, the optimization process may be conducted under the alignment condition to guide the thickness at different layers of the shielding construction to reduce the MS-loss. The parameters that are affected by the optimization process under misalignment condition and alignment conditions are separated in Table IV, provided above.

B. Configuration Process

Based on an FEA optimization process that utilizes the constraints described herein, the optimized geometries for a wireless power transmitter 210 and the wireless power receiver 220 may be determined. Examples of such a determination are depicted in illustrated embodiment of FIGS. 16, 17, and 18B, which are based on the following parameters: $B_{ref}$=21.2, $\mu T_{peak}$ and $B_{buff}$=5 $\mu T$. The values of the optimized MS parameters for the shield construction determined in accordance with one embodiment on as follows:

TABLE V

OPTIMIZED MS PARAMETERS

| MS Parts | Parameter | Value |
|---|---|---|
| Rx SL-2 | $w_{SL-2}, l_{SL-2}, t_{SL-2}$ | 650 mm, 600 mm, 2 mm |
| Rx SL-1 | $w_{SL-2}, t_{SL-1}$ | 50 mm, 5 mm |
| Tx SL-1 | $w_{SL-1}, t_{SL-1}$ | 50 mm, 5 mm |

Figure 18A:
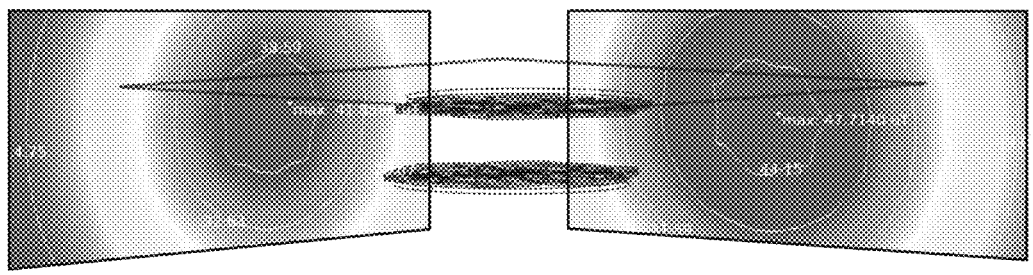
FIG. 18A shows flux density under misalignment in accordance with one embodiment.
Figure 18B:
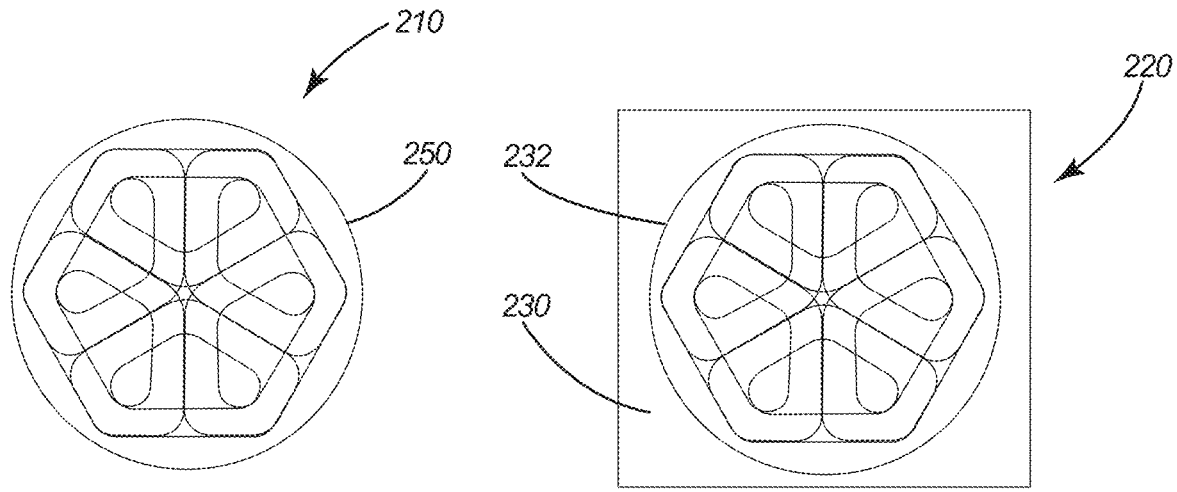
FIG. 18B depicts a wireless power transmitter to wireless power receiver configured in accordance with one embodiment.
Figure 18C:
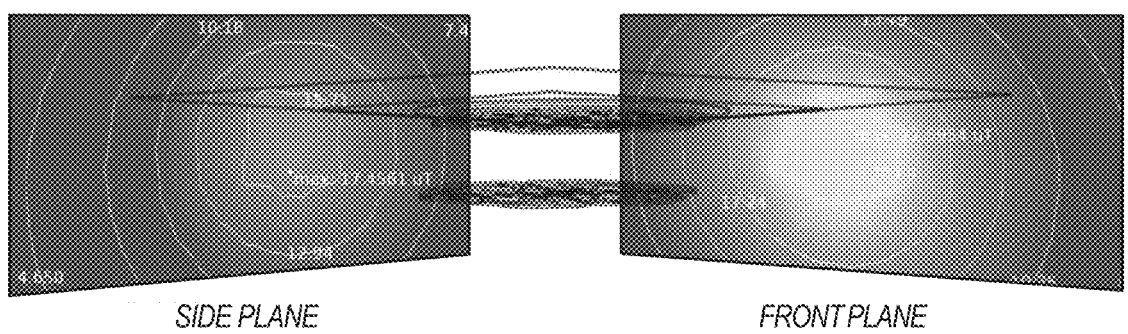
FIG. 18C depicts flux density for the configuration depicted in FIG. 18B.

The flux density distribution on the S-plane and F-plane for such a shield construction including the SL-1 and SL-2 on the receiver side and the SL-1 on the transmitter side, under the maximum misalignment condition (x=75 mm, y=100 mm), is depicted in FIG. 18C. The results show that the peak flux density on the S-plane has been reduced to 17.45 $\mu T_{peak}$ compared to 41.85 $\mu T_{peak}$ of an unshielded system, which is depicted FIG. 18A.

It is noted parameters of the SL-1 and SL-2 adjusted in accordance with one embodiment include the width, thickness, and length of the SL-1, SL-2 and depend on the overall type of shape of the SL-1, SL-2. In the illustrated embodiment, the SL-1 and SL-2 correspond to a shield configuration including two or more layers, with the SL-1 being the primary layer and the SL-2 being a secondary layer having a larger area and smaller thickness than the primary layer. Additionally, for shielding constructions having more than two layers, successive layers of the shield construction may be greater in area.

The SL-1—the primary layer—in one embodiment may be similar in area to the core 214, 234, with a thickness that is 20% to 60% of the thickness of the core 214, 234. The thickness of the primary layer may be greater than a thickness of the secondary layer. Additionally, for shielding constructions having more than two layers, successive layers of the shielding construction may be smaller in thickness.

The present disclosure is not limited to any particular geometric configuration of the SL-1 and the SL-2, and geometric parameters for any type of geometric configuration may be adjusted in accordance with one or more embodiments described herein to facilitate field suppression.

Figure 17:
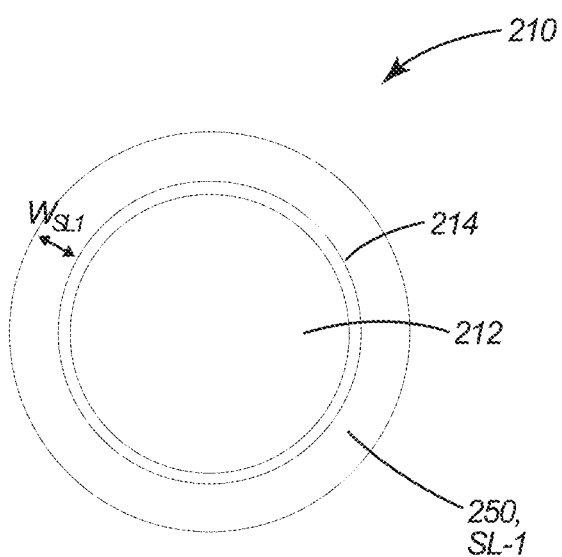
FIG. 17 depicts a wireless power transmitter accordance with one embodiment.

For instance, with respect to the shield SL-1 250, 232 being a circular configuration, as depicted in FIGS. 16 and 17, the width $w_{SL1}$ may correspond to a distance between an outer perimeter of the core 214, 236 and an outer perimeter of the shield SL-1 250, 232. Alternatively, the width $w_{SL1}$ may correspond to a distance between an inner perimeter of the shield SL-1 250, 232 and an outer perimeter of the shield SL-1 250, 232, where an aperture is defined within the inner perimeter. A gap may be present between the inner perimeter of the shield SL-1 250, 232 and the outer perimeter of the core 214, 236 as described herein in conjunction with the shield 150.

With respect to the shield SL-2, 234 rectangular configuration, as depicted in FIG. 16, the width $w_{SL2}$ may correspond to an overall width of the shield SL-2, 234, and the length $l_{SL2}$ may correspond to an overall length of the shield SL-2, 234. These parameters may be adjusted in accordance with one or more processes described herein, including an FEA optimization process.

Figure 19:
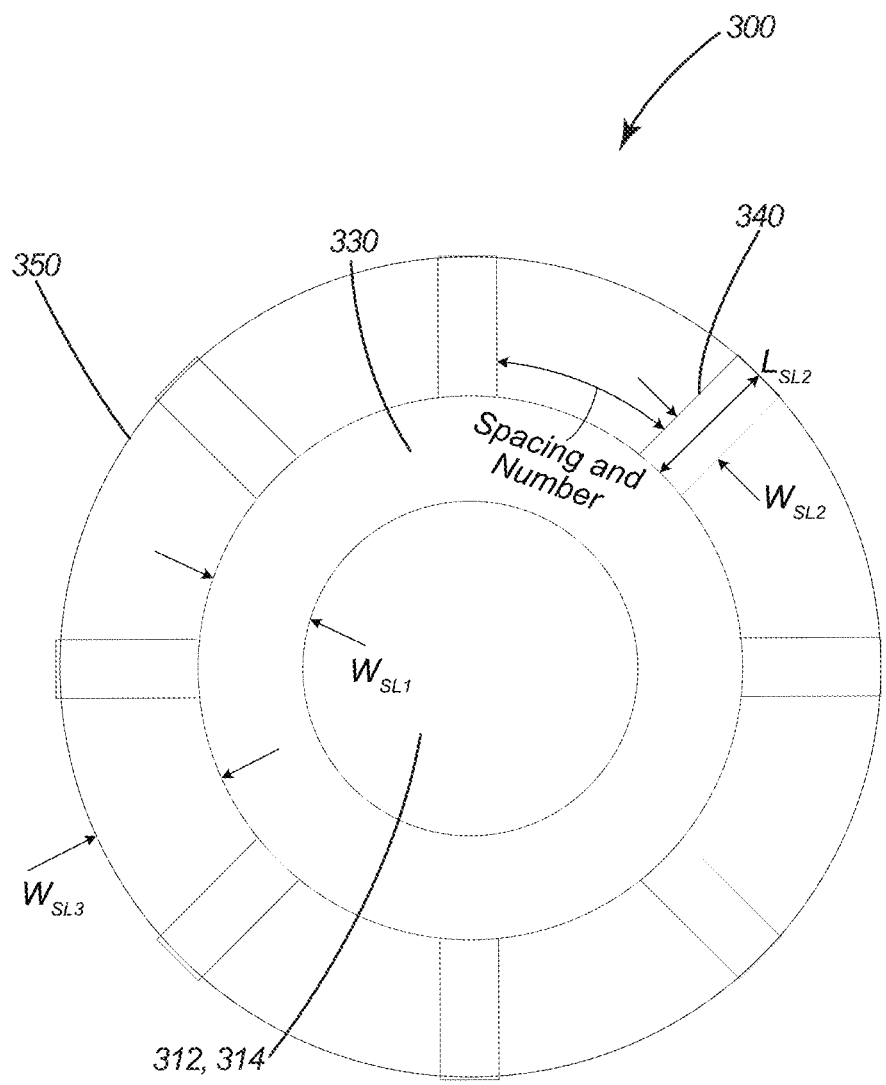
FIG. 19 shows a wireless power transmitter in accordance with one embodiment.

A wireless power transmitter in accordance with one embodiment is depicted in FIG. 19 and generally designated 310. The wireless power transmitter 310 may be similar to the wireless power transmitter 210 described herein, including a transmitter coil 312 and a transmitter core 314 similar to the transmitter coil 212 and the transmitter core 214. Shielding aspects described herein in conjunction with the wireless power transmitter 310 may be incorporated into a wireless power receiver, such as the wireless power receiver 120, 220.

The wireless power transmitter 310 in the illustrated embodiment includes a multilayer shield construction, including a primary shield 330, a secondary shield 340, and a tertiary shield 350. The primary shield 330 may be similar in some respects to the shield SL-1, 250, 232 described in conjunction with the wireless power transmitter 210.

The disclosed magnetic material-based shield configuration of the wireless power transmitter 310 may include three layers, SL-1, SL-2, and SL-3 disposed around the transmitter coil 312, a receiver coil in the context of a wireless power receiver, or both. The shield SL-1 330 may be a primary layer, and the secondary shield SL-2 340 and the tertiary shield SL-3 350 may be optional secondary and tertiary layers, respectively.

The thickness of the primary layer, the shield SL-1 330, may be comparable to the transmitter core 314, while the secondary layer SL-2 and tertiary layer SL-3 may be much thinner. The width, thickness, and overall geometrical span of each layer may be subject of optimization based on the power level, application constraints, and shielding targets.

In the illustrated embodiment, the tertiary shield SL-3 350 is shaped in a manner similar to the primary shield SL-1 330, and therefore geometric parameters for configuration of the tertiary shield SL-3 350 and the primary shield SL-1 330 may be similar, including width $w_{SL1}$, $w_{SL3}$ and thickness $t_{SL1}$, $t_{SL3}$. Geometric parameters for the secondary shield SL-2 340 may be different, primarily because the secondary shield SL-2 340 corresponds to a plurality of radially disposed segments. Example geometric parameters for the secondary shield SL-2 340 include a length and width of each segment and a number of the segments disposed about the transmitter core 314.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A wireless power transfer (WPT) system for wirelessly providing AC power to an electric vehicle or a plug-in electric vehicle, the system comprising:
   an off-board transmitter including:
      a transmitter pad configured to wirelessly transmit the AC power across a gap, the transmitter pad comprising a double-D (DD) coil backed by a core; and
   an on-board receiver including:
      a receiver pad configured to receive the AC power when the transmitter pad and the receiver pad are disposed adjacent to each other and spaced apart through a gap, the receiver pad comprising a DD coil backed by a core and having an outer perimeter, and
      a magnetic material-based shield that is disposed, on the core side of the receiver pad that opposes the gap, to form a border with an internal aperture that defines an inner perimeter, wherein a space is provided between the inner perimeter of the border and the outer perimeter of the receiver pad, wherein the magnetic material-based shield is configured to guide horizontally dominant leakage magnetic field from the receiver pad to suppress magnetic field emissions from the system; and
      the magnetic material-based shield including high-permeability magnetic material,
      wherein the space between the inner perimeter of the border and the outer perimeter of the receiver pad has predetermined sizes for corresponding sides of the receiver pad,
      wherein the space is determined to provide a low reluctance return path for the horizontally dominant leakage magnetic field, and
      wherein a width of the border has predetermined sizes for the corresponding sides of the receiver pad.

2. The system of claim 1, wherein:
   the off-board transmitter comprises another magnetic material-based shield that is disposed, on the core side of the transmitter pad that opposes the gap, to form a border around the transmitter pad, and
   the other magnetic material-based shield including high-permeability magnetic material.

3. A wireless power transfer (WPT) system for wirelessly providing AC power to an electric vehicle or a plug-in electric vehicle, the system comprising:

an off-board transmitter including:
- a transmitter pad configured to wirelessly transmit the AC power across a gap, the transmitter pad comprising a double-D (DD) coil backed by a core, the transmitter pad comprising an outer perimeter;
- a magnetic material-based shield that is disposed, on the core side of the transmitter pad that opposes the gap, to form a border with an internal aperture that defines an inner perimeter, wherein a space is provided between the inner perimeter of the border and the outer perimeter of the transmitter pad, wherein the magnetic material-based shield is configured to guide horizontally dominant leakage magnetic field from the transmitter pad to suppress magnetic field emissions from the system; and
- the magnetic material-based shield including high-permeability magnetic material,
- wherein the space between the inner perimeter of the border and the outer perimeter of the transmitter pad has predetermined sizes for corresponding sides of the transmitter pad,
- wherein the space is determined to provide a low reluctance return path for the horizontally dominant leakage magnetic field, and
- wherein a width of the border has predetermined sizes for the corresponding sides of the transmitter pad; and an on-board receiver including:
- a receiver pad configured to receive the AC power when the transmitter pad and the receiver pad are disposed adjacent to each other and spaced apart through the gap, the receiver pad comprising a DD coil backed by a core.

4. The system of claim 3, wherein each of the transmitter pad and the receiver pad includes a respective aluminum backplate disposed such that the pad's core is sandwiched between the pad's DD coil and the pad's aluminum backplate.

5. The system of claim 3, wherein the receiver pad includes an outer perimeter, and wherein the on-board receiver includes a magnetic material-based shield that is disposed, on the core side of the receiver pad that opposes the gap, to form a border with an internal aperture that defines an inner perimeter, wherein a space is provided between the inner perimeter of the border and the outer perimeter of the receiver pad, wherein the space between the inner perimeter of the border and the outer perimeter of the receiver pad has predetermined sizes for corresponding sides of the receiver pad.

6. The system of claim 5, wherein a width of the border of the on-board receiver has predetermined values for corresponding sides of the receiver pad.

7. The system of claim 5, wherein, for each of the transmitter pad and the receiver pad, a thickness of the border has predetermined values for corresponding sides of the respective transmitter pad and receiver pad.

8. The system of claim 3, wherein the high-permeability magnetic material includes either a continuous layer or multiple bars.

9. The system of claim 3, wherein the high-permeability magnetic material includes one of ferrite, magment, or nanocrystalline material.

10. The system of claim 3, wherein the high-permeability magnetic material includes material like the core's material.

11. The system of claim 3, wherein the AC power is in a range of 5-50 k W.

12. The system of claim 11, wherein the AC power is about 11 kW.

13. The system of claim 3, wherein a fundamental frequency of the AC power is in a range of 3 kHz-10 MHz.

14. The system of claim 13, wherein the fundamental frequency is about 85 kHz.

* * * * *